United States Patent
Knaapen et al.

(10) Patent No.: US 9,810,409 B2
(45) Date of Patent: Nov. 7, 2017

(54) LIGHTING SYSTEM, TRACK AND LIGHTING MODULE THEREFORE

(71) Applicant: PHILIPS LIGHTING HOLDING B.V., Eindhoven (NL)

(72) Inventors: Bram Knaapen, Eindhoven (NL); Anthonie Hendrik Bergman, Nuenen (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/772,494

(22) PCT Filed: Mar. 5, 2014

(86) PCT No.: PCT/EP2014/054199
§ 371 (c)(1),
(2) Date: Sep. 3, 2015

(87) PCT Pub. No.: WO2014/135555
PCT Pub. Date: Sep. 12, 2014

(65) Prior Publication Data
US 2016/0018092 A1    Jan. 21, 2016

Related U.S. Application Data

(60) Provisional application No. 61/773,853, filed on Mar. 7, 2013.

(30) Foreign Application Priority Data

Apr. 22, 2013 (EP) .................................... 13164629

(51) Int. Cl.
*F21V 1/00*    (2006.01)
*F21V 21/35*    (2006.01)
(Continued)

(52) U.S. Cl.
CPC .............. *F21V 21/35* (2013.01); *F21S 2/005* (2013.01); *F21V 23/04* (2013.01); *F21V 23/06* (2013.01);
(Continued)

(58) Field of Classification Search
CPC .... F21S 2/00; F21S 8/06; F21V 21/15; F21V 21/35; F21V 23/06; F21V 23/04
(Continued)

(56) References Cited

U.S. PATENT DOCUMENTS 6,296,372 B1 * 10/2001 Rhomberg ................ F21S 8/06
                                                   362/217.07
7,806,569 B2 * 10/2010 Sanroma .................. A47F 3/001
                                                   362/398
(Continued)

FOREIGN PATENT DOCUMENTS

DE         2643780 A1    3/1978
DE    102011076128 A1   11/2012
(Continued)

OTHER PUBLICATIONS

Evonik Acrylite, www.acrylite.net/rpoduct/acrylite/products, Downloaded Aug. 31, 2015, 2 Pages.
(Continued)

*Primary Examiner* — Bryon T Gyllstrom

(57) ABSTRACT

A lighting system comprising a track having a first and a second rail (5, 7), mutually extending equidistantly. Said first and second rail comprise a first respectively a second electrically conductive strip, mutually electrically isolated. A lighting module (17) comprising a first and second electrical contact, which lighting module in mounted position rests by gravitational force on the first and second rail. When mounted the first and second electrical contact are in electrical contact with a respective one of the first and second
(Continued)

electrically conductive strip. The lighting module is dismountable from the track by a single displacement of the lighting module in a direction against the direction of the gravitational force.

17 Claims, 11 Drawing Sheets

(51) Int. Cl.
| | |
|---|---|
| *F21S 2/00* | (2016.01) |
| *F21V 23/06* | (2006.01) |
| *F21V 29/70* | (2015.01) |
| *F21S 8/06* | (2006.01) |
| *F21V 21/15* | (2006.01) |
| *F21V 23/04* | (2006.01) |
| *F21Y 105/00* | (2016.01) |
| *H01R 25/14* | (2006.01) |
| *F21V 8/00* | (2006.01) |
| *E04B 9/30* | (2006.01) |
| *F21Y 103/10* | (2016.01) |
| *F21Y 115/10* | (2016.01) |
| *F21Y 113/00* | (2016.01) |

(52) U.S. Cl.
CPC ............... *F21V 29/70* (2015.01); *E04B 9/30* (2013.01); *F21S 8/061* (2013.01); *F21V 21/15* (2013.01); *F21V 23/045* (2013.01); *F21V 23/0457* (2013.01); *F21V 23/0464* (2013.01); *F21V 23/0471* (2013.01); *F21V 2200/20* (2015.01); *F21Y 2103/10* (2016.08); *F21Y 2105/00* (2013.01); *F21Y 2113/00* (2013.01); *F21Y 2115/10* (2016.08); *G02B 6/0041* (2013.01); *G02B 6/0083* (2013.01); *G02B 6/0091* (2013.01); *H01R 25/147* (2013.01)

(58) Field of Classification Search
USPC ........................................................ 362/235
See application file for complete search history.

(56) References Cited

U.S. PATENT DOCUMENTS

| 7,954,975 | B2* | 6/2011 | Zhou | G02B 6/0043 |
| | | | | 362/147 |
| 8,926,134 | B2* | 1/2015 | Hast | F21V 17/162 |
| | | | | 362/227 |
| 2003/0179578 | A1 | 9/2003 | Albert et al. | |
| 2006/0262521 | A1* | 11/2006 | Piepgras | E04B 9/006 |
| | | | | 362/149 |
| 2007/0002558 | A1* | 1/2007 | Pryor | H01R 25/147 |
| | | | | 362/147 |
| 2008/0037284 | A1 | 2/2008 | Rudisill | |
| 2008/0054814 | A1* | 3/2008 | Deppe | H05B 33/0803 |
| | | | | 315/192 |
| 2008/0087464 | A1 | 4/2008 | Patterson et al. | |
| 2009/0267502 | A1 | 10/2009 | Diekmann | |
| 2010/0126090 | A1 | 5/2010 | Liang | |
| 2010/0126104 | A1 | 5/2010 | Boss et al. | |
| 2010/0157582 | A1 | 6/2010 | Bertken | |
| 2010/0157585 | A1* | 6/2010 | Diekmann | F21S 6/002 |
| | | | | 362/228 |
| 2010/0254121 | A1 | 10/2010 | Zhou | |
| 2010/0271834 | A1* | 10/2010 | Muessli | F21V 21/35 |
| | | | | 362/398 |
| 2011/0037840 | A1 | 2/2011 | Hiltl | |
| 2011/0199790 | A1* | 8/2011 | Murakoshi | G02B 6/0068 |
| | | | | 362/621 |
| 2011/0205757 | A1* | 8/2011 | Whyte | F21S 2/005 |
| | | | | 362/607 |
| 2012/0287671 | A1* | 11/2012 | Parker | F21S 2/005 |
| | | | | 362/609 |

FOREIGN PATENT DOCUMENTS

| EP | 1433996 A2 | 6/2004 |
| EP | 1491835 A2 | 12/2004 |
| FR | 2033490 A5 | 12/1970 |
| JP | 2010009886 A | 1/2010 |
| WO | WO0231406 A1 | 4/2002 |
| WO | WO2010097733 A1 | 9/2010 |
| WO | WO2014135554 A2 | 9/2014 |
| WO | WO2014135556 A1 | 9/2014 |

OTHER PUBLICATIONS

Evonik Acrylite, http://www.acrylite.net/product/acrylite/en/products/acrylite-led/light-guiding-edge-lit/p . . . , downloaded Sep. 2, 2015, 1 page.

* cited by examiner

LIGHTING SYSTEM, TRACK AND LIGHTING MODULE THEREFORE

CROSS-REFERENCE TO PRIOR APPLICATIONS

This application is the U.S. National Phase application under 35 U.S.C. §371 of International Application No. PCT/EP2014/054199, filed on Mar. 5, 2014, which claims the benefit of U.S. Provisional Patent Application No. 61/773,853, filed Mar. 7, 2013 and European Patent Application No. 13164629.1, filed on Apr. 22, 2013. These applications are hereby incorporated by reference herein.

FIELD OF THE INVENTION

The invention relates to a lighting system comprising a track and a lighting module. The invention further relates to a track and a lighting module.

BACKGROUND OF THE INVENTION

In retail and office environments it is common practice to use track-based systems to build the lighting system. These tracks can be suspended or recessed into the ceiling. To these tracks, lamps can be attached. Different types of these tracks are available. Some work with 230V but there are also lower voltage versions that enable different types of lamps to be used with the track. The track acts as a conductor of electricity and as a means to attach the lamps to. The lamps are usually mounted using some sort of clip. The main advantage of track-based systems is the flexibility it offers. It allows building an infrastructure of tracks which then allows lamps to be placed underneath the infrastructure of tracks built into that space.

Within the domains of architecture and interior decoration there is a clear trend towards unobtrusiveness. This also has implications or rather opportunities for the lighting domain in that within the retail and office environments there is a clear trend towards unobtrusive lighting systems. Track systems are often used in these environments as they offer a lot of flexibility. The tracks are used to build the basic infrastructure for both the fixing and the powering of the lamps. There are a few disadvantages to this system i.e.:

With most current systems the lamps hang underneath the rail. In case of a retail environment where oftentimes spots are used this means that there are a lot of high power (3000 lm) lamps are attached to the rail and directed onto their targets (like shelves or mannequins). This results in a visually disturbed picture: a rail with lamps hanging underneath it all directed into different directions. This attracts undesirable attention, as the focus of the customers should be on the products that are for sale.

In current track based systems the light module is attached to the track with some sort of clamp. Attaching the lamp to the track or moving the module is often difficult to do. It requires two hands and pressure from the hand to close or release the clamp and all of this above your head standing on a ladder. Moreover, the clamp regularly also establishes the electrical connection, so when the lamp can be moved the light is off and there is no feedback on the actual movement of the light-effect. This lack of ease-of-use limits the shop owner or lighting designer to adjust the lighting on the fly as they see fit after the system has been installed. This for example would be desirable when the shop owner decides to move around some furniture when updating the store or when a lamp needs to be replaced by another one which is more suitable in the new situation.

Current track based lighting systems have lamps hanging underneath a rail. This makes it difficult to light something on the ceiling as this will require the light to be redirected from a downwards direction into an upwards direction. Furthermore, the strip itself will be in the light path, hampering a uniform or light projection on the ceiling.

Track based lighting systems having a pair of equidistant electric conductive (metallic) cables as rails for mounting of the lamps have the disadvantage that said cables itself are not rigid and thus have to be mounted with great tension to give them some rigidity rendering the installation of such lighting system relatively complex and cumbersome. Furthermore, the tensioned, equidistant cables are still susceptible to vibrations and/or moving apart already by relatively small forces. This generally is counteracted by connecting the equidistant cables by bridges, but then these bridges need to be spaced apart at such small distances that the free moving and positioning of lighting modules on said track are significantly hampered.

As mentioned above, in modern lighting systems there is a need to have a great deal of flexibility in the user's ability to easily control the quantity, direction, and characteristics of the light emitted from the system. In theater settings, one is accustomed to observing a number of light fixtures capable of directing light of varying intensities, color, and other characteristics onto the stage. In commercial settings, adjustable reflector lamps and track lights are frequently employed to illuminate merchandise or displays. In office and residential settings, track lights are typically used to direct light to a particular work area or for visual effect. In applications where the appearance of the lighting system itself contributes to its overall aesthetics, there are additional design and production costs. A lighting system comprising a track with a removable lighting module and fulfilling the abovementioned issues is known from U.S. Pat. No. 7,806,569. In the known lighting system the lighting module is mounted on a track by an attractive force between magnetic material of the light module and magnetic material of the track such that a light module may be installed on, removed from, or relocated on the track manually without tools or permanent electrical connection.

Yet this known system has disadvantages. One disadvantage is that while this system is flexible, it still is cumbersome to adjust for different lighting requirements due to the presence of relatively high permanent magnetic forces intended to hold the lighting module in fixed position onto the track. When the lighting system is used to fit in false ceilings, the lighting module suspends from said track and is attached to it only by magnetic force, said force must thus be high enough to prevent the relatively lighting module to detach from the track, even during shocks. Another disadvantage of the known lighting system is that this it is relatively costly because of the use of (relatively strong) magnetic materials to hold the relatively heavy lighting module. Yet another disadvantage of the known system is that an incidental drop of the lighting module involves the risk of breakage of the lamp. Finally, there is the disadvantage of the known lighting system that it is obtrusive due to the lighting module protruding from the track. As the lamps hang underneath the track, the rail itself will be in the light path, hampering a uniform or light projection on the ceiling.

SUMMARY OF THE INVENTION

It is an object of the invention to provide a lighting system of the type as described in the opening paragraph in which at least one of the disadvantages is obviated. The object is accomplished by a lighting device comprising:

a track comprising at least a first and a second rail mutually extending equidistantly along an axis, said first and second rail are spaced apart by an opening defining a plane P and the first rail comprises a first electrically conductive strip and the second rails comprises a second electrically conductive strip, said strips are mutually electrically isolated, at least one lighting module comprising a first and second electrical contact adapted to make electrical contact with a respective one of the first and second electrically conductive strip when supported by a respective carrier side of both the first and the second rail, and comprising a base having a mutually opposing first and second side, the lighting module and track being free from mutual overhang to enable to dismount the lighting module from the track by a displacement in a direction essentially perpendicular to plane P, wherein the track comprises the light source, preferably the lighting module has a light incoupling surface facing towards the light source and light outcoupling surface at its first side. Said light incoupling surface could be the same as the transverse side wall of the base in which contact pens are resiliently seated. The light source can emit light into the lighting module or emit light towards a light redirection element, for example a reflector or refractive body to redirect the light into a target direction. Due to their relatively small size, LEDs are in particular suitable to be located in the track. LEDs offer much more design freedom to design lighting systems and luminaires compared to luminaires designed to accommodate conventional light sources as, for example, halogen incandescent lamps, fluorescent lamps, and high pressure gas discharge lamps. Also LEDs are becoming more efficient and cheaper very rapidly. This leads to a future situation where the LEDs will only account of a small portion of the Bill Of Material (BOM) compared to the dominant position they hold right now Thinking along the path of "LEDs for free" offered a few new ways of applying LEDs to answer to the need for flexible systems in a new way.

With flexible rail-like systems there always is a trade-off between which components go in which part of the system. For example, electronics, optics, mechanics etc. Usually the LEDs and sometimes the driving electronics are integrated into the lighting module. These components/parts use up a certain amount of space. In this embodiment of the lighting system of the invention, a system is proposed in which the LEDs are located in the side of the rail instead of being located in the light module, preferably in combination with the use of waveguides, optionally with out-coupling particles mixed in them, to direct the light to target locations in the ambient space. This embodiment enables the possibility of relatively thin designs, cheap and passive modules which can be exchanged easily by the user. Because the modules are so simple it is relatively cheap to develop many different ones which enrich the flexibility of the system from a users' utility point of view. A further cheap embodiment of the lighting system is characterized in that the optic plate is provided with light outcoupling pattern at at least one of its first and second side.

Generally the track extends in a flat manner in plane, though slightly curved, out of plane, tracks are possible as well and do all within the scope of this invention. The lighting system according to the invention offers a more unobtrusive lighting system keeping the of the known track based systems while at the same time taking away some of the disadvantages of said known track lighting systems. The opening in between these two rails defines the space available for the module. The module fits exactly within the space defined by the two rails. This allows for the integration of the lamps into the track rather than hanging them underneath the track. Furthermore said opening enables to position office infrastructure elements, for example air conditioning means sprinkler means and smoke/fire detectors, in an unobtrusive manner.

This rail provides space for the module to emit light directed towards the top, from the top of the module and emit light directed towards the bottom from the bottom side of the module. Also different types light modules can be made that allow light to be emitted under an angle and re-directable. Therefore this rail allows for multiple types of light modules (up and down light for instance). Also sensors can be integrated in the top and the bottom of the module reaching an almost 360-degree sensing view. Also if necessary these modules can be much longer than traditional lamps as they can stretch along the rail.

In the lighting system according to the invention the lighting module rests on the track essentially only by gravity forces so that a lighting module may be installed on, removed from, or relocated on the track manually without tools or without necessarily being permanently electrically connected. The lighting module and track being free from mutual overhang to enable to dismount the lighting module from the track by a displacement in a direction essentially perpendicular to plane P, i.e. can be taken out from the track in a direction transverse to plane P, for example in a direction against gravity, without finding any blocking or hampering parts, for example an interlocking structure or a resiliently structure that needs to maneuvered around or bend to free the way. This system is flexible and adjustment for different lighting requirements is simple. To counteract the lighting module to fall from the track, the rails on which the lighting module rests, could be provided with ridges that limit sidewise movements of the lighting module and keep it on the strips. As magnetic materials are obsolete in the lighting system of the invention for fixation of the lighting module on the track, the lighting system is relatively cheap, yet magnetic materials still can be applied in the inventive lighting system, for example to keep the module on the rail(s), to counteract mutual collision or too close proximity of lighting modules present on the same strips of the track. However, as the module has not to be solely carried by the magnetic force, the magnetic force in this case could be relatively small, in particular when the lighting modules are carried on wheels and lighting modules can roll practically frictionless over the rails/track. The relatively small magnetic force then hardly hampers easy dismounting of the module from the strips.

US20110199790A1 discloses fixing brackets as a first and second rail mutually extending equidistantly along an axis and comprising a first, respectively a second mutually isolated electrically conductive strip and comprising a light source.

US20120287671A1 discloses a light guide comprising a first and second electrical contact and a base with a mutually opposing first and second side.

BRIEF DESCRIPTION OF THE DRAWINGS

The invention will now be further elucidated by means of the schematic drawings in which the dimensions of some features might be exaggerated for clarity and which drawings by no means are to be taken as to limit the scope of the invention, but rather to illustrate the ample possibilities of the invention. In the drawing

DETAILED DESCRIPTION OF PREFERRED EMBODIMENTS

Figure 20:
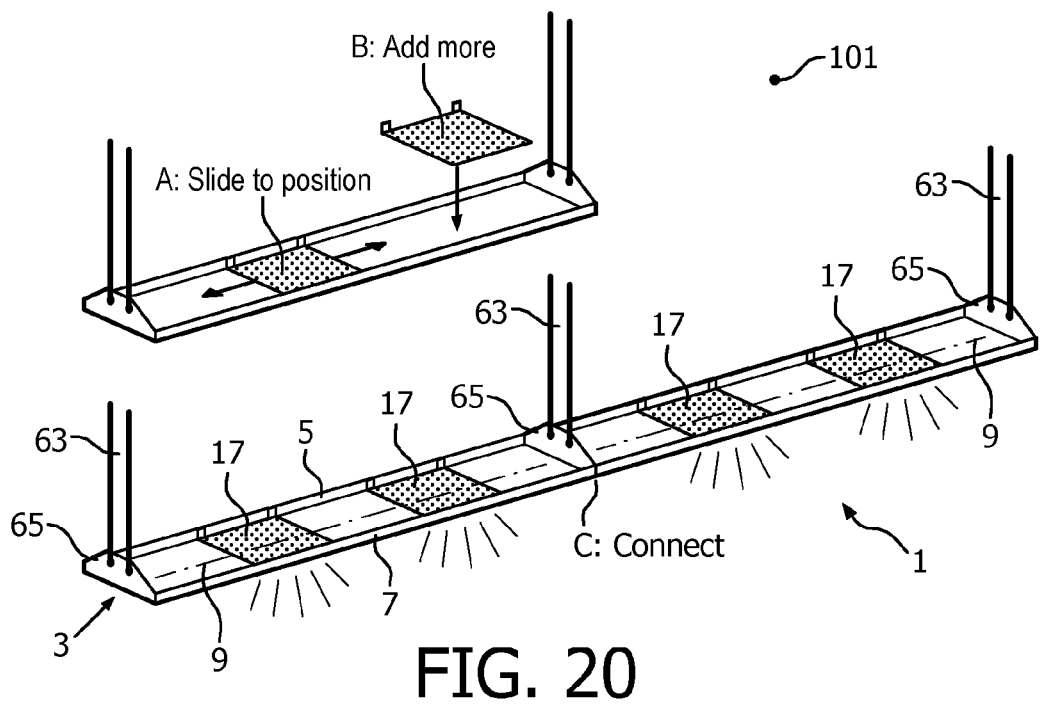
FIG. 20 shows a perspective view of a sixth embodiment of the lighting system according to the invention.
Figure 21:
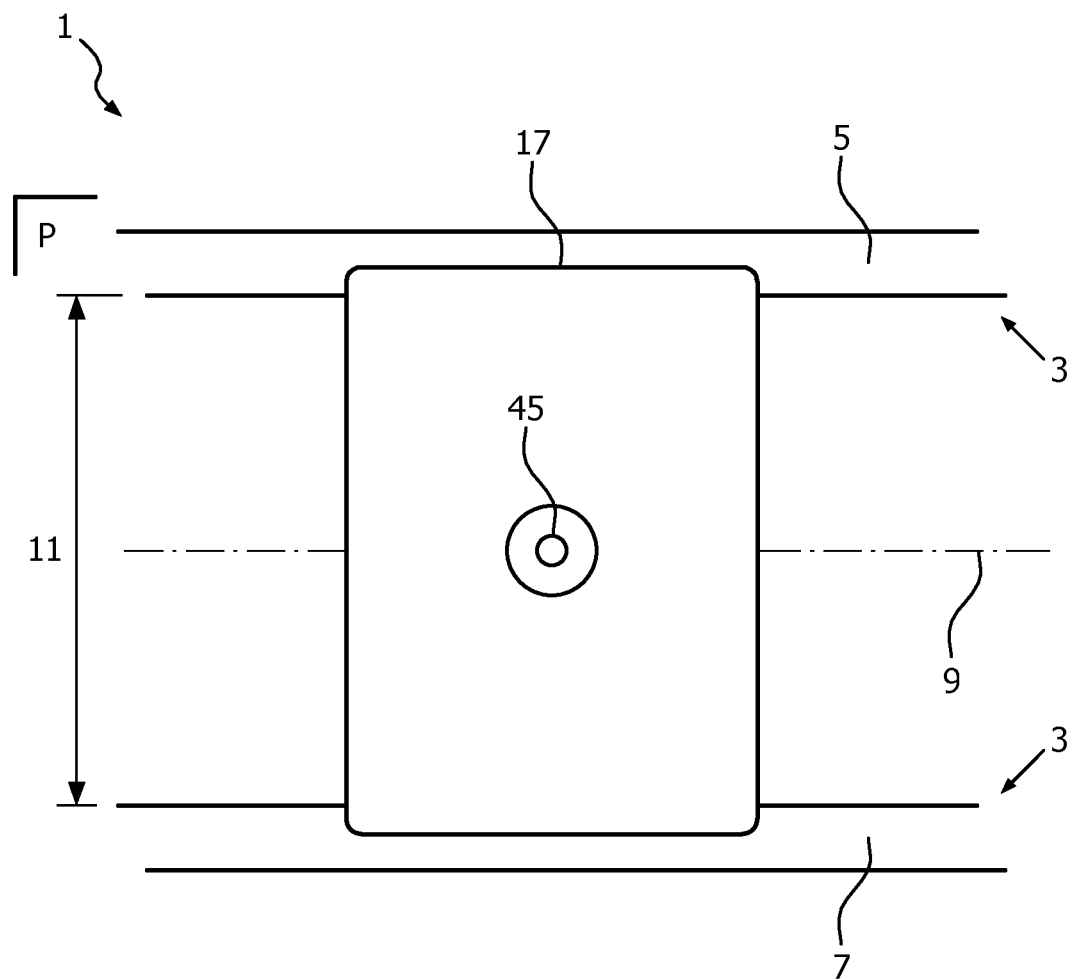
FIG. 21 shows a general, basic lighting system according to the invention.

The invention and advantageous embodiments will be generally described at the hand of the basic, general FIG. 21. A subsequently more detailed description of the advantageous embodiments will be done at the hand of FIGS. 1 to 20.

FIG. 21 shows a schematic top view of the basics of the lighting system 1 according to the invention. The lighting system comprises a track 3 comprising a first 5 and a second rail 7 extending mutually parallel along an axis or length axis 9. The first and second rail are spaced apart by an opening 11 lying in a plane P as defined by the parallel extending first and second rail. If the first and second rail are slightly curved, i.e. that the first and second rail together bend slightly out of a flat plane upwards or downwards, then the plane P is considered locally and follows the curvature of the first and second rail. Both the first and second rail can electrically contact a lighting module 17 when it is mounted on the track. In mounted position the first side of the lighting module rests with gravitation force on the track and is dismountable therefrom by a simple displacement of the lighting module in an upwards direction against the gravity direction 45. The opening is large enough to access the lighting module by hand from below for lifting the lighting module and to pass it through the opening and through plane P to below the track.

The two rails (that make up the track) are not only used to carry the modules but also are used to electrically connect with the modules and to position the modules. The two rails can be formed in such a way the light module "falls into place" as it is forced by gravity and the slope of the rails. A truncated, open wedge is one of the shapes that provides such function. The track of the lighting system is rigid, such that it will not deform or have only neglectable deformation, i.e. deformation which is insignificant for its functioning, under its own weight and also will also have neglectable deformation under gravitational forces exerted by the load of the lighting modules.

The electrical contacting of the module to connect to the rails can be done in multiple ways. For example, by using good conductors like copper to make the rail from, power can be delivered to the modules placed in the rail through galvanic connection. Also other mechanisms of power delivery can be used like capacitive power transfer not requiring a galvanic connection between the rail and the modules. The combination of the shape of the parts that make the rail with the ability to transfer power makes it very easy to install modules by dropping them in from the top or by sliding them in from the bottom.

A range of different light modules can be envisioned. These can be more like the traditional down lighters or spots. But they can also be more advanced lamps that have been optimized for a particular light quality e.g. color rendering, texture rendering or modeling. Also light can contribute to the atmosphere of the space. Pre-set light modules can be made with pre-designed optics that will create the most beautiful atmosphere-enhancing patterns on the walls. Also dynamic light modules that are connected to the internet or have an embedded sensor become within the range of possibilities. Because it's easy to replace them, they almost become 'physical light apps'.

An embodiment of the lighting system is characterized in that the lighting module is passable through plane P via said opening. When the track is mounted in a false ceiling and flush with other ceiling tiles, then the strips are only directly accessible from one side, i.e. from below the ceiling. This embodiment of the lighting system is particularly convenient as exchange or addition of lighting modules is then simplified, i.e. it is not necessary to temporarily remove other ceiling tiles to have access to the strips of the lighting system.

An embodiment of the lighting system is characterized in that the lighting module is essentially planar and/or that the first side of the lighting module is essentially flush with the first and second rail. The lighting module thus does not protrude from the track/strips and thus cleaning of the lighting system is simplified, moreover the risk on incidentally hitting a protruding lighting module and its possible subsequent fall from the track is reduced, for example when the system is applied in false ceilings, and the lighting system and/or the first side of the lighting module is flush with the ceiling tiles. Furthermore, the unobtrusiveness of the lighting system is improved thereby.

An embodiment of the lighting system is characterized in that the first and second electrical contact are provided at the first side of the lighting module and that the first and the second electrically conductive strip are provided at the carrier side of the first respectively the second rail. In the standard installed orientation of this embodiment of the lighting system an easy mounting of the lighting module and mutual electrical contacting of strips and module is simply attained and maintained by gravitational force, thus enabling a very simple construction and desired adjustment of the lighting system. However, this embodiment involves the risk that it could be susceptible to dust collection on the electrically conductive strips. Said dust collection might negatively influence the reliability of mutual electrical contact between the electrical conductive strips and the electrical contacts of the lighting module. To counteract dust collection an embodiment of the lighting system is characterized in that first and second electrical contact are provided at a side face extending from the first side towards, and optionally connecting, the second side and that the first and a second electrically conductive strip are provided on the rail at a respective rail wall extending from the carrier side normal to plane P along the axis. In the normal installed orientation of the lighting system the electric conducting strips are vertically oriented and less susceptible to dust collection, thus reducing the risk on deterioration or degradation of establishing electrical contact with the lighting module. To further enhance the reliability of the mutual electrical contact between strips and the module an embodiment of the lighting system is characterized in that the electrical contacts are slightly magnetic, resilient and/or resiliently seated in the base, preferably in a transverse side wall of the base facing towards a respective one of the first and second rail. Furthermore, when the electrical contacts are located at the side face this renders the lighting system to have the advantage to enable to horizontally turn the lighting module over 180° and yet the module to electrically connect to the strips.

An embodiment of the lighting system is characterized in that the lighting module comprises the light source. The lighting system can be further characterized in that the lighting module with the base accommodates the light source and has at least one light emission window in at least one of the first and second side. In these embodiments the lighting module is considered to be a lamp in which the first and/or the second side of the lighting module has a second light emission window. It is thus enabled turn the lighting module upside down (or in other words: flip 180° over a horizontal axis) and thus to switch between, for example, upward lighting and downward lighting or thus to simply switch between beam characteristics, like narrow beam and broad beam, or to switch between a beam directed to the left and directed to the right. Alternatively, for enabling the lighting module to flip and electrically contact with the strips, it is possible that the module has electrical contacts on both the first side and the second side.

The resiliency of the electrical contacts could come from the contacts itself being made as springs or come from the electrical contacts being resiliently seated spring pens. These pens push parallel to the length of the module. For example, the lighting module has four pens, two on both sides. The profile of the module and the profile of the rail can be embodied such:

That both pins will push against the profile on both sides.

The profile of the rail is chamfered on the top so that the pins are gradually pushed into the module. This makes it easier to get them in between the two rails that make the strip.

The same chamfers can be found on the edges of the module and the rail.

There is a thin isolated layer of copper on the inside of the profiles which become the conductors. One side is the anode, the other one the cathode.

Due to the internal springs the four pins push outwards. This could cause the first and second rail to be pushed away from each other, thus increasing the opening in between said first and second rail and thus enhancing the risk on the lighting module to fall. This can be counteracted, for example by:

By using an L or U profile, these profiles are more rigid because of the perpendicular walls along the edge of material when compared to an I-rail profile;

By using a chamfered slit inside the module that will force the module into a defined distance to the conducting part (and thus pushing the pens inwards.

Though the pins' contact surface is small, it should be big enough to conduct the current. The small surface area has benefit when moving the module along the length of the strip. The scratching will remove any dirt or corrosion.

An embodiment of the lighting system is characterized in that the rail has a cross section profile chosen from the group consisting of a U-profile, an L-profile, a concave curvature towards the lighting module, and a combination of the first and second rail forming a wedge-shape. The first and second profiled rails are put together such that there is an opening in between for the lighting modules. The lighting modules can, for example, be lamps, control, and power modules. The form of the rails could (partly) define the auto-positioning ability of the lighting module. Different shapes and sizes of rails can be used. However, there are some considerations to be made with respect to the form of the rail which can be prioritized depending on the application. With some applications some of these features can be omitted. In particular these considerations are:

The form has to be such that the lighting module can be made within the dimensions of the rail;

The form has to be such that the ability to transfer power from the rail to the lighting module is sufficient;

The module preferably should auto-center when dropped in from the top to enhance ease of mounting/installation;

To further enhance the ease-of use a mounted lighting module should be easy to be removed, moved and placed on the track;

When the lighting module is mounted on the track, a permanent gravity force pulls the lighting module downwards, the phenomenon that the first and second rail could be pushed apart by said force, making the module not to be flush with the track but hang (slightly) below the track, preferably should be coped with;

Embodiments of the rail that have a surface facing (a least a bit) upwards, have the danger of accumulation of dust on the surface of the profile, the possible impairment of the transfer of power should preferably be handled;

To build a system of rails, the rails should be connected to each other at least mechanically and possibly also include power transfer.

Such U-, L- and wedge-profiled rails counteract the risk on sidewise movements of the lighting module and/or the rails and thus reduce the risk of the lighting module to fall from the track or to get off the strips and loose electrical contact therewith. In particular, when the lighting module is provided with grooves that, in mounted position, grip around at least a part of a respective rail, for example as is present in a U-profile or L-profile of the rails, has the advantage that it is not removable from the rails and strips in a sidewise displacement, hence always keeps aligned with said strips. The module is only removable from the rails and strips by a single displacement of the lighting module in a direction against the direction of the gravitational force. Furthermore, a sidewise movement of a single rail or both rails/strips is also obviated due to the gripping action of the module around (a part of) the rails. Additionally, this renders the lighting system to be more rigid as the module itself has the additional feature of acting as a bridge between the two rails. Optionally, the number of bridges could be reduced. The bridge function of the lighting module could be of particularly relevance when the track has an elongated shape along the axis. An elongated track enables the lighting module as such to be (freely) shiftable over said track along the length axis over relatively long distances, but simultaneously the lighting module, when provided with rail gripping grooves, to act as bridges to render the elongated track to be more rigid. The opening in between the first and second rail can be used by the designer as they see fit depending on the applications. In some cases it is desired to have the lighting module within the area defined by the upper and lower edges of the track/rails. In other cases it is also acceptable when the lighting modules stick out a little bit. The lighting modules can be equipped with standard light sources, but also side-emitting LEDs along with a light-guide are an option.

A specific embodiment of the lighting system is characterized in that the first and second rail are mutually axially aligned and together are shaped as a(n open truncated) wedge extending along the axis as a consecutive connected sequence of insets. Said insets are built-up by in- and outwardly bulging parts of the wedge shaped track. When these insets match with the shape of the module, it is attained that the module snaps into a predetermined place. This specific form of the track and lighting module enables the track to be are put under an angle relative to gravity or tilted along its axis (length direction) while the module will remain positioned in the inset, thus undesirable, automatic slide down of the modules is simply counteracted. Alternative ways to counteract said undesired slide-down are by making use of clamps or magnets.

The lighting module can also be designed to be re-directable within the track. This adapted shape of the lighting module, for example at least partly sphere-like, can be tilted within the wedge shaped track and therefore be used to redirect the direction of the light. It is however important that the center of gravity is always in the center of the radius of the sphere or that the center of gravity moves to a position right in between the rails and in the position set by the user.

An embodiment of the lighting system is characterized in that the lighting module is provided with grooves present on both the first and second side of the lighting module. This renders the lighting system to have the advantage to enable to flip the lighting module and yet to maintain the gripping of the module onto the rails and hence to maintain its bridging function.

An embodiment of the lighting system is characterized in that the lighting module is chosen from the group consisting of a power supply, a voltage power converter, a current source, a coupling module for coupling two lighting systems, and a user interactive receiver plus control module. The power demand of the modules can be different. Therefore we propose a system with a modular power system where the power supplies are formed into the same form factor. That allows the user to add power-supply modules to the system whenever necessary (more light modules mean more power modules). Or replace a certain power module by another more powerful module. Using a module as a power supply also enables the user to add the power where there is a power socket available. The power supply can be dropped into the strip at any place as well. This is especially a nice feature whenever a temporal show requires more light locally and power can be moved from one area to another easily. This ensures no conflict with overall power regulations (max power/feet$^2$).

When the lighting module is a power supply, the lighting system is connected to the mains via a power cable to the power supply enabling that the average installed power of the lighting system is low, but the used power can be set higher by increasing the number of power supplies. For example, if one power supply lighting module supplies 25 Watt (W), and 50 Watt power is needed, then simply a second power supply module of 25 W (with additional power cable to the mains, or optionally via the first power supply module) is added to meet the demand. To enable a flexible amount of installed (driving) power it is desired to equip or power modules with a so called Automatic Current Balance (ACB). This technique is known form the electronic industry where it functions in redundant power system. (20 amps is supplied by 2 sources of 10 amp, the ACB takes care of an even load distribution). This technique can also be utilized to simply add power sources when more power is needed. Generally, the power supply module simultaneously is a power converter from AC mains to, for example, 12V or 24V DC, rendering the lighting system to be safe to humans.

The lighting system comprising rails and electrically conductive strips could be considered to form the mechanic and electric infrastructure. To enable the user to install the strips in whatever configuration they want, it should be possible to connect the different parts of the strips. This lighting module for example, comprises two module-parts with a cable in between. Both parts look the same and connect to the strip. When the lighting module is a coupling module or "ferry" module, a very simple possibility is attained to electrically couple/decouple two lighting systems with proximate ends by placing/removing a coupling module at both said proximate ends.

When the lighting module is a current source this renders the lighting system to have the advantage that the voltage difference over the two strips remains constant and that each power consuming lighting module, for example when the lighting module is a lamp, can tap the amount of current which is optimal for its light source(s), for example LED(s). This renders the advantage that the performance of a plurality of lighting modules that are lamps is mutually independent, and the advantage of a robust set-up of the lighting system.

Next to the light and power modules also the application of communication modules are an option. This type of lighting module can be added to the system to allow external sources to connect to the lamps in the systems such as remote controls or data-sources. It is very convenient for users when the lighting module is a user interactive receiver and control module, this renders the lighting system to have the advantage that the settings of the lighting system are easily remotely adjustable.

People nowadays are hesitant when they want to replace a lighting module from a conventional, known track or rail as it requires quite some force and knowledge about the secure/release system. Also when removing the lamp it's better to have the lamp turned off when removing. Currently, the lamp will get very hot and when detaching sparks may fly (due to the high current). To prevent both issues it would be better to turn the lamp off before removing it. But that would turn the light off, which makes it harder for the user to see what the light effect looks like. In the lighting system according to the invention there are various ways to fix this. For example, a first solution is to turn of the module through a UI where the off signal is sent through the network. A second solution is to make the module turn off automatically when it is approached by a hand. In turn the module can turn itself on when the hand is removed. This can be done with different types of sensors like IR sensors and proximity sensors.

An embodiment of the lighting system is characterized in that the lighting module has curved side walls. In particular, when the profile is concave curvature towards the lighting module, or a combination of the first and second strip has a wedge-shape, the lighting system has the advantage that in mounted position said lighting module rests with its curved side walls on the rail and being tiltable around the axis while staying electrically connected. The lighting module being tiltable renders the lighting system to have the advantage to enable simple and continuous, in other words not in discrete steps, redirection and/or adjustment of, for example an issued spot light beam issued by the lighting module. When the lighting system is embodied as having at least one light emission window tilted with respect to the side in which it is present the angle over which the beam can be redirected is enlarged by a combination of tilting the lighting module and rotation of the module over 180° around an axis perpendicular to plane P.

An embodiment of the lighting system is characterized in that the track comprises the light source and preferably that the lighting module has a light incoupling surface facing towards the light source and light outcoupling surface at its first side. Said light incoupling surface could be the same as the transverse side wall of the base in which contact pens are resiliently seated. The light source can emit light into the lighting module or emit light towards a light redirection element, for example a reflector or refractive body to redirect the light into a target direction. Due to their relatively small size, LEDs are in particular suitable to be located in the track. LEDs offer much more design freedom to design lighting systems and luminaires compared to luminaires designed to accommodate conventional light sources as, for example, halogen incandescent lamps, fluorescent lamps, and high pressure gas discharge lamps. Also LEDs are becoming more efficient and cheaper very rapidly. This leads to a future situation where the LEDs will only account of a small portion of the Bill Of Material (BOM) compared to the dominant position they hold right now Thinking along the path of "LEDs for free" offered a few new ways of applying LEDs to answer to the need for flexible systems in a new way.

With flexible rail-like systems there always is a trade-off between which components go in which part of the system. For example, electronics, optics, mechanics etc. Usually the LEDs and sometimes the driving electronics are integrated into the lighting module. These components/parts use up a certain amount of space. In this embodiment of the lighting system of the invention, a system is proposed in which the LEDs are located in the side of the rail instead of being located in the light module, preferably in combination with the use of waveguides, optionally with out-coupling particles mixed in them, to direct the light to target locations in the ambient space. This embodiment enables the possibility of relatively thin designs, cheap and passive modules which can be exchanged easily by the user. Because the modules are so simple it is relatively cheap to develop many different ones which enrich the flexibility of the system from a users' utility point of view. A further cheap embodiment of the lighting system is characterized in that the optic plate is provided with light outcoupling pattern at at least one of its first and second side.

The main components of this embodiment of the lighting system comprise at least one rail with integrated LEDs and separate modules. The first and second rails support the modules. The module comprises a light guide, for example in the form of PMMA plates. Optionally the light guide holds scattering particles which scatter the light in a diffuse way, or alternatively the light guide is a diffuse plate either by bulk properties or a surface treatment, for example sandblasted.

In the rail+LED combination the possibility is enabled to built-in a mechanism resulting in the behavior that when a lighting module, i.e. light guide plate becomes/is present a number of locally present LEDs are turned on and when the plate is removed or not present said LEDs are turned off. This behavior can be attained in different ways, i.e.:

via a conductive pattern on a PCB, this embodiment allows a dynamic definition of the circuit;

via the detection of the module→action turn LED on, via configurations and/or sensors;

via a reed switch, i.e. a lighting module (light guide) with on the ends a strip of magnetic material. On an inner side of the rail a Reed switch is located which will close the circuit that enables the LED that is directly below the switch;

masking, one way of getting the desired behavior (coupling light into the lightguide and not being able to see light from the rest of the strip) can also be achieved by turning on all the LEDs all the time. To hide the light of the unused LEDs the LEDs can be masked e.g. by sliding planes (in front of the LED) attached to a spring. By laying the optical plate into the rail the mask would be (re)moved and the light would be coupled into the plate as it would line up.

Preferably sufficient LEDs are present to ensure that wherever the module(s) are placed it can always be lit by at least one LED from one side, more LEDs are better as homogeneity of light output is improved thereby.

It should be noted that in the previous embodiment, all LEDs are connected in series and that it requires additional measures to install more than one module. Depending on the electronics setup it is possible to use multiple modules in one rail. To attain this, in this embodiment, a capacitor is added to control the current via which the use multiple lighting modules on a track is enabled. The LEDs are grouped in pairs and connected in anti-parallel to a capacitor. Because the LEDs are driven in AC mode the capacitor acts as an efficient current control. The lighting module now only needs to make a connection between a first and a second contact point and everywhere where this connection is made, the LED pair will light up. This arrangement allows any number of LEDs to be connected. Such a lighting system with a parallel arrangement of the LEDs enables the use of a plurality of lighting modules.

An embodiment of the lighting system with the track comprising the light source is characterized in that at least one of the strips comprises at least one PCB on which at least one LED is mounted. It is possible to slide the lighting module along the length of the strip and the LEDs will turn on and off as the module is moved. To get this abovementioned behavior the system comprises a track and an optic plate, for example a waveguide plate such as PMMA, as the lighting module, the track comprising a first and second rail. The rails support the waveguide plate so that the plate can be laid into the space in between the two rails that make the track. In the side of the rails LEDs are placed on top of a PCB also provided in the rails, and a mounted lighting module makes electrical contact with the electric conductive strips on the PCB. An embodiment of the lighting system is characterized in that the light incoupling surface is the side face extending from the first side towards the second side and that facing towards said side face the LEDs are located on the rail at a respective rail wall extending from the carrier side normal to plane P along the axis. The LEDs and PCBs are then designed such that the LEDs line up exactly with the optic plate modules, i.e. the lighting module has a light incoupling surface facing towards and opposite the light source. There are many different design possibilities of the lighting module possible if the basic form of the lighting module is a light guide of which the edge aligns directly with the LEDs in the strip. From that edge onwards there are countless possibilities. For instance:

1. A normal straight square plate of PMMA with light diffusing particles mixed in homogeneously, for example known as EndLighten: Evonik ACRYLITE® EndLighten, see also: http://www.acrylite.net/product/acrylite/en/products/sheet/endlighten/pages/default.aspx "Embedded with colorless light diffusing particles that cause light to diffuse forward, ACRYLITE® EndLighten acrylic sheet accepts light through its edge and redirects it to the surface for bright, uniform illumination. ACRYLITE EndLighten T is a new material for powerful ambient lighting that is specially adjusted to transparent applications illuminated with LEDs. Unlike the familiar grade of ACRYLITE EndLighten, the new material shows no clouding and emits light at a much more vertical angle to the surface. In addition to its optimized frontal light output, ACRYLITE EndLighten T is highly transparent, even if no light is fed into the material."

The same lighting module as described in 1 but then provided with slits that have been laser cut into the wave guide plate material under a 45 degree angle. This will reflect part of the light that has not been diffused downwards (or downwards). This will cause the module to direct more light downwards than upwards at choice.
Many patterns of slits and structures can be designed. Slits preferably do not extend over the whole width of the plate, as this will compromise the stability of the plate.

If only one direction is desired a simple mirror, for example. MIRO foil, can be applied on one side. This will cause the light to have roughly double intensity on one side.

If laser cuts inside the plate light are made, light that will hit the slit will change direction due to total internal reflection. When laser cuts are used the plate starts to behave as a spot as the light from the sides is re-directed into one direction.

The lighting module's wave guide plate can be formed out of the plane P of the track, enabling a variety of 3D-shapes of the wave guide plate.
Various effects are attainable upon combination of the abovementioned possibilities; for example, a wave guide plate made of EndLighten material with laser cut slits will create a spot downwards and diffuse light in all directions.

An embodiment of the lighting system is characterized in that the lighting module has its electrical contacts at end parts that contact the strips, in mounted position of the lighting module on the strips said electrical contacts at a first and a second contact point connect to respectively an anode and to a cathode contact strip provided in the rails, to enable ignition of the (LED) light sources located in between said first and second contact point. For example, on four corners, two corners at each end of the lighting module, two pairs of "electric contacts" are mounted. These contacts connect at one end of the lighting module the anode to the series of LEDs while at the other end the cathode is connected to the series of LEDs. The electric contacts are made as a connector block of copper with two pins each. The two pins are at a distance to each other that corresponds with the distance between the electric conductive strips on the PCB. The pins also provide for the force necessary to make a proper contact between the different strips on the PCB via the connector-block.

An embodiment of the lighting system is characterized in that said anode and cathode are conductive strips extending along the length of the rail, preferably located on a respective rail wall extending from the carrier side normal to plane P along the axis. The profile of the conductive layer is designed such that all LEDs are connected in series. Above the row of LEDs there is an anode and a cathode electric conductive strip. Essentially said strips extend continuously from the beginning to the end of the track/rail. The module consists of a plate of PMMA. The PMMA has been provided with diffusing elements, for example the optic plate is provided with light outcoupling pattern at at least one of its first and second side, which is a relatively easy and cheap method to provide such diffusing elements, such that the lighting module (wave guide) appears transparent when no LEDs are turned on and it will light up/become opaque and act as a diffuse light source when the LEDs are turned on.

Another embodiment of the lighting system is characterized in that the anode is located in the first and cathode is located in the second rail, and that the lighting module on transverse side faces that bridge the gap between the first and second rail and extend between the first and second side, is provided with connector strips to close an electrical circuit and to enable ignition of the (LED) light sources that are comprised in said circuit. In this embodiment, each rail of the track has an arrangement of LEDs, either an electrical plus or a minus electrode, and a single electrical connection per rail. In this case the plus and minus need to cross the opening between the first and second rail via the transverse sides of the lighting module. Rails of relative simple construction are thus enabled.

In an alternative embodiment of the lighting device all the LEDs in the rails are turned on all the time. By inserting the module the light is directed into the module rather than somewhere else (e.g. down/upwards or into an absorber). This embodiment is technically very simple and cheap, it is, however, relatively energy inefficient and therefore in many cases not the best option.

A way to create a desired, more or less automated behavior of the lighting system is by actively detecting the lighting module and subsequently acting upon said detection. Thereto an embodiment of the lighting system is characterized in that the lighting system comprises a sensor. Sensors can be located in the module itself, in the track or separate but close to the lighting system and can be used in different configurations in the lighting system, for example:

Configuration 1: In this case the individual LEDs and individual sensors are setup in a network and every LED and sensor has a predefined position and address. A CPU collects all the sensor information and drives the LEDs;

Configuration 2: The LED and sensor are integrated into one package and addressed. The CPU is interfaced with the LED-sensor combination through the addresses;

Configuration 3: The LED and sensor are integrated as well as the intelligence. This is an example of distributed intelligence. The basic embodiment is that when the sensor detects the edge of a lighting module, the LED turns on. In a more advanced embodiment the sensor is able to pick up additional information from the edge of the module such as color and intensity information. Because of the embodied intelligence there is only a Power line;

Configuration 4: A LED module comprises integrated intelligence and a separate sensor. The rest is similar to Configuration 3;

Configuration 5: The sensor and intelligence are integrated into one package and the LED is connected to this sensor-intelligence (+driver) combination.

Different embodiments of detection of a module by a sensor are envisaged. In this embodiment the lighting module comprises a transparent material (light guide) which is equipped with a small strip of material/painted on a layer on the side or on the top close to one of the edges of the module. This strip can be detected by the sensor. Thereto an embodiment of the lighting system is characterized in that a sensor combination is selected from:

Reflective material+optical reflection sensor;

Magnetic strip+magnetic sensor, for example Hall sensor or Reed switch;

Electrical conductive strip+connectors, for example pins that connect galvanic;

Conductive strip+capacitive sensor;

RF tags/transmitters in the modules and detectors/receivers in the LED/rail.

In more advanced forms these combinations also enable information to be packed into the pattern of the strip. This information could give every LEDs data on the light that is required at a particular place. The method by using the LEDs and the property of light-guiding can be used to turn on the light. Even though most of the light should be out-coupled before it reaches the end of the light-guide some of the light will reach the other end of the light guide and optionally can be detected and used for further purposes. When the LEDs is provided with additional light sensors or LEDs acts as light sensors, the LEDs sense whether the optical plate is in front of the LEDs or not. The principle is then used that more light from the opposite LED reaches the opposing sensor/LED as sensor when it is guided through an optical plate rather than emitted into the environment in a rather broad beam.

Furthermore it is advantageous to periodically check the status of the lighting system and lighting modules. For example, every period every LED would emit a predefined "Presence sequence". When there is a no light guide present the light would be emitted into all directions. However, when emitted into the light-guide more light would hit the sensor on the other side of the strip. Detection of this signal would turn on the LEDs on the opposite side. This method may not even require opposite LEDs as part of the light emitted into the light-guide from one direction will reflect back into the same direction because of the diffusing particles inside the material and the air-PMMA connection.

In particular in the case of LEDs as light sources, but also in the case of point-like, compact discharge lamps and halogen incandescent lamps having a relatively high power, for example 50 W HID or 75 W halogen lamps, heat management is an issue. Thereto an embodiment of the lighting is characterized in that the rails are embodied as heat sinks to dissipate heat generated by the lighting module.

To counteract this risk of corrosion of the conductive strips with accompanying negative effect on power transfer from strips to lighting module, a second alternative of the lighting system is characterized in that a spacing is present in between the rails and the electrical contacts to enable capacitive power transfer (e.g. at 100 kHz), which further has the advantage of safe, isolated (low) voltage, and that the rails/strips can be painted to render the lighting system even more unobtrusive.

As the electrical contact in the track based lighting system is inherently exposed to dust and open to corrosion, an embodiment of the lighting system is characterized in that the rails are protected by a coating, for example are coated with, for instance, paint or aluminum-oxide. For the electrical power transfer use is made of capacitive or inductive coupling, as in both methods a direct metal-to-metal connection is not required. An additional benefit of the coated rails is of an aesthetical nature. Instead of "technical" looking conductors, now coated rail track surfaces are visible which enable the track to either blend in or stand out from the environment. For example, alumina coated rails were connected to an HF electrical amplifier. By using the capacitance that exists between the rail and the lighting module and adding an appropriate inductance, a resonance circuit is attained. Driving it with roughly 50 kHz-500 kHz power could be transferred to the boat. To attain proper alignment between lighting module and the rail for good capacitive power transfer, the electrical contacts of the lighting module are fixed to the base of the lighting module via flexible material, for example silicone rubber.

The electronics of the lighting module can be very simple, for example a lighting module with a simple 4 diode-bridge and an inductor. The bridge can even be omitted when two strings of LEDs are used that are connected in opposite directions. In that case the strings will light up sequentially, but as this is done at high frequency, the sequential light-up that cannot be observed. Probably the thermal load will be identical even at twice the current but half the time.

Various parameters have an effect on the efficiency of the lighting system. For example, the total power transferred is depending on whether the right resonance frequency is used. This frequency depends on the capacitance of the 'connection'. As this might be influenced by proper positioning or by excessive dust the system should be adjusted. This can be done by proper aligning and removing the dust, but alternatively an embodiment of the lighting system according to the invention is characterized in that it comprises an automatic tuning circuit. This automatic tuning circuit could for instance continuously check the amount of power transferred while changing the frequency slightly and thus finding the optimal frequency for improved and efficient power transfer.

An embodiment of the lighting system is characterized in that the lighting module is equipped with rotatable wheels to enable the lighting module to ride over said track along the length axis. Another means for galvanic connection is by using wheels like with trains. The wheels are attached to the sides of the module which would allow the module to be powered from the rails through the wheels. This embodiment has the advantage that the interaction of moving the lighting modules along the track is very smooth. Motors can be put into the lighting module onto the wheels and that would enable the lighting modules to ride along the track, optionally via remote control. This can be useful in a dynamic 'light show' or in multi-purpose rooms where the light settings needs to change often. When the rail and the wheels are made such that they attract each other due to the use of magnets the lighting module can also be mounted to the strip upside-down, which however, is relatively expensive and therefore not preferred. To counteract the risk on mutual high impact collision of lighting modules, as a consequence of the very smooth moving of the light modules along the track, an embodiment of the lighting system is characterized in that the lighting module is provided with an anti-collision system, for example in that the lighting modules are provided with repulsing magnet, for example only north-pole magnets at the transverse sides of the lighting modules An embodiment of the lighting system is characterized in that the light sources are controllable, i.e. in that the characteristics of the light issued by the light source is controllable on intensity (dimming or boosting), spectral composition as color and color temperature, and/or light distribution. This enables the possibility to easily adjust the illumination level to a desired level, for example via a user interface, such as a remote control. It further enables an embodiment of the lighting system which is characterized in that the controllable light sources have a receiver to receive input for setting a control level, for example by an occupancy sensor or by an external user interface command, and have an activator to control the light characteristics of at least one neighboring light source. A so-called "swarm intelligence" behavior of a group of lighting modules can thus be attained. For example situations with swarm intelligence light that could be obtained and which leads to efficient energy use, are:

Lighting modules operating at full intensity only where needed, for example where presence is detected;

Surrounding luminaires at medium intensity, hence no sudden drop in light intensity between adjacent/neighboring lighting modules Distant luminaires at low intensity, hence never completely dark areas.

The swarm intelligence concept therefore preferably involves features like:

The lighting module or group of lighting modules can detect a presence using an appropriate detector;

The lighting module can detect modulated light, for example by using a photodiode;

The light emission of the lighting module is encoded for example by using a certain frequency or digital code with the current operation status of the respective lighting module, for example Detect daylight→stay off;

Detect presence→turn on with light setting 1, code 1, for example use of 100% nominal power;

Detect code 1→turn on with light setting 2, code 2, for example use of 80% nominal power;

Detect code 2>turn on with light setting 3, code 3, for example use of 50% power;

Detect code 3→nothing;

Every lighting module reacts to its own presence detector and to the coded light signal it detects from neighboring lighting modules.

The fact that an individual lighting module reacts to the behavior of its surrounding lighting modules, results in a system like behavior of all lighting modules, which is similar to a swarm of birds or fish which seem to behave like a coordinated system or group. The lighting system enables ample possibilities to sense the presence of ambient light and neighboring lighting modules, as the track has an opening between the first and second rail which enable the lighting module to emit light both upwards and downwards. Also different types light modules can be made that allow light to be emitted under an angle and re-directable. Therefore this rail allows for multiple types of light modules (up and down light for instance) and sensors can be integrated in the top and the bottom of the module reaching an almost 360-degree sensing view.

To capture the value of the versatility of the lighting system, it preferably ensures that a control system is in place that does not require difficult steps such as commissioning of new lighting modules etc. The easy control of a flexible and potential large system can be guaranteed by using swarm intelligence, and for this reason swarm intelligence preferably is added to each lighting module. In that way each additional lighting module will behave as the other already present lighting modules are behaving as well. The system will be robust and can be enlarged without restraint. Thus, the lighting system clearly offers advantage over a common known lighting, track based system. Its main attractiveness is its versatility and ease of use. One can very easily change the number and type of boats. Also the nature of the lighting modules can be adapted by exchanging the lighting modules.

An embodiment of the lighting system is characterized in that at least one, preferably all, of the lighting modules comprises a soft start circuit. To facilitate a smooth and safe installation of additional modules, it is desired to equip each module with a "soft start" circuit. So at the instance when the module is connected to the system it does not consume or deliver a large amount of power, preventing sparks and other unwanted electrical effects. The soft start circuit is designed to limit inrush current to a safe value. When the power source is switched on, the initial current drawn from the mains is many times that, even at full power. There are two main reasons for this, as follows:

Transformers will draw a very heavy current at switch on, until the magnetic flux has stabilized. The effect is worst when power is applied as the AC voltage passes through zero, and is minimized if power is applied at the peak of the AC waveform.

At power on, the filter capacitors are completely discharged, and act as a short circuit for a brief (but possibly destructive) period.

These phenomena are well known to manufacturers of very high power amplifiers. The inrush current drawn is so high that other equipment is affected. This high inrush current is stressful on many components in the lighting system, for example on:

Fuses—these must be slow-blow, or nuisance fuse blowing will be common

Transformer—the massive current stresses the windings mechanically and electrically.

Bridge rectifier—this must handle an initial current way beyond the normal, because it is forced to charge empty filter capacitors—these look like a short circuit until a respectable voltage has been reached Capacitors—the inrush current is many times the ripple current rating of the caps, and stresses the internal electrical connections The invention further relates to a track being suitable for use in the lighting system according to the invention, the track comprising at least a first and a second rail mutually extending equidistantly along an axis, said first and second rail are spaced apart by an opening defining a plane P and the first rail comprises a first electrically conductive strip and the second rails comprises a second electrically conductive strip, said strips are mutually electrically isolated, wherein the track comprises a light source and comprises at least one of a sensor and an additional detectable material. Embodiments of said track have the characteristics of the track of the lighting system as described in respective abovementioned embodiments.

The invention further relates to a lighting module being suitable for use in the lighting system according to the invention, the lighting module comprising a first and second electrical contact adapted to make electrical contact with a respective one of the first and second electrically conductive strip when supported by a respective carrier side of both the first and second rail, and comprising a base having a mutually opposing first and second side and wherein the lighting module comprises at least one of a sensor and an additional detectable material extending over a first and or second (and not the transverse) side face. Embodiments of said lighting module have the characteristics of the lighting module of the lighting system as described in respective abovementioned embodiments.

Figure 1:
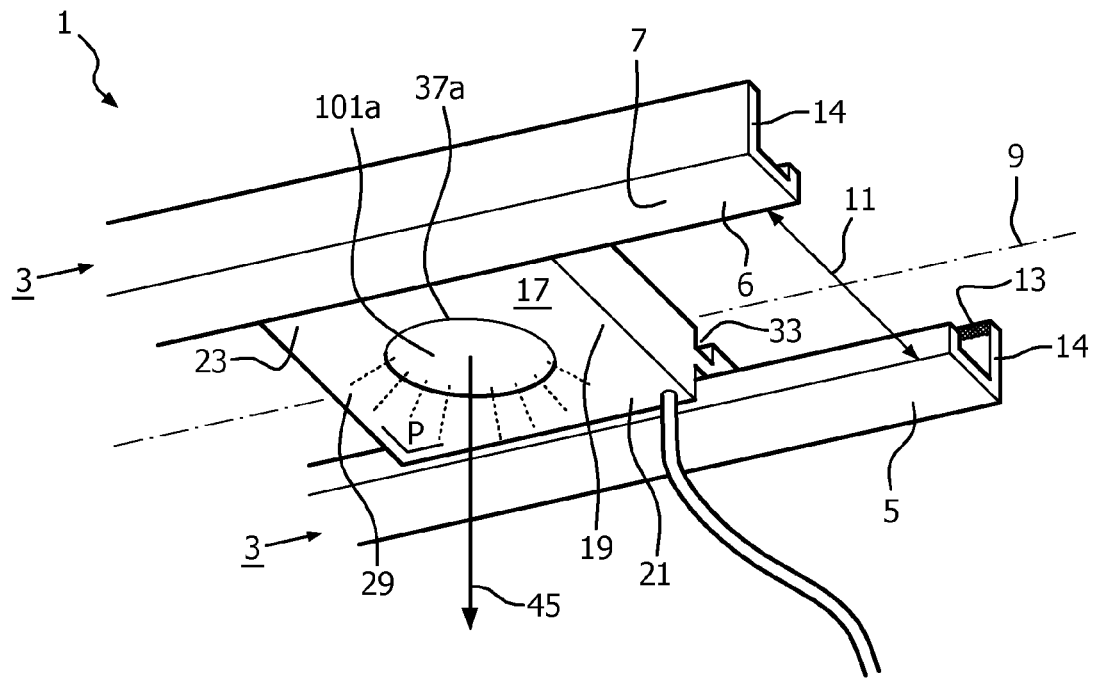
FIG. 1 is a perspective bottom view of a first embodiment of the lighting system according to the invention.
Figure 2:
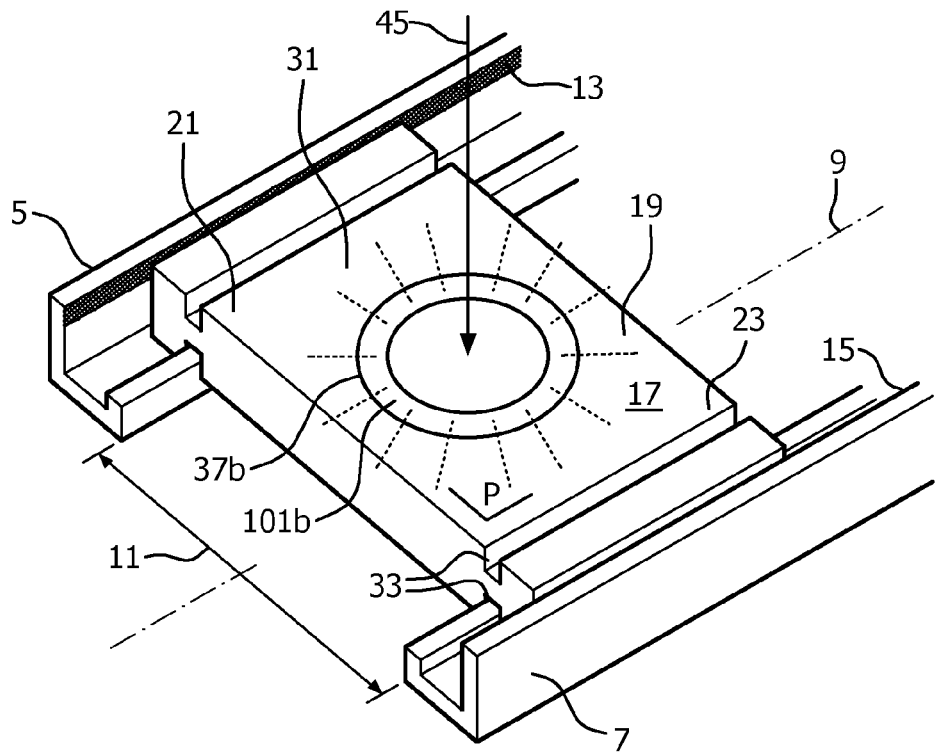
FIG. 2 is a perspective top view of the lighting system of FIG. 1.

FIGS. 1 and 2 schematically show respectively a perspective bottom view and a top view of a first embodiment of the lighting system 1 according to the invention. The lighting system comprises a track 3 comprising a first 5 and a second rail 7 extending mutually parallel along an axis or length axis 9. The first and second rail are spaced apart by an opening 11 lying in a plane P as defined by the parallel extending first and second rail. If the first and second rail are slightly curved, i.e. that the first and second rail together bend slightly out of a flat plane upwards or downwards, then the plane P is considered locally and follows the curvature of the first and second rail. The first and second rails have a U-shaped profile in cross-section. Both the first and second rail comprise a respective conductive strip 13,15 which are isolated from each other and are provided at a respective rail wall 14 extending from a carrier side 6 of the rail normal to plane P along the axis. Alternatively, the conductive strips could be provided on a respective of the carrier sides itself. The lighting system further comprises a lighting module 17, in the figure a power supply/a voltage power converter/a current source/a user interactive receiver plus control module, having a base 19 with a first end 21 and a second end 23 that are provided with a first 25 and respectively with a second electrical contact 27 (see for example FIG. 4). In mounted position of the lighting module on the track, it rests on the carrier side of the rail and the electrical contacts make electrical contact with the conductive strips. The base comprises a first 29 and second side 31 each provided at the first and second end with a respective groove 33 which in mounted position grips around a part of the first respectively the second rail. The grooves are both present at the first and second side of the base and on said both sides are provided with electrical contacts and enable the lighting module to freely be shifted over the track along the axis and/or to be flipped around a horizontal axis and thus to be mounted in a reversed orientation. The first side comprises a first light emission window 37a with a first refractive (collimating) optical element 101a, the second side comprises a second light emission window 37b with a second refractive (spreading) optical element 101b. The first and second optical elements differ in color and refractive characteristics, the first and second light emission windows differ both in size and shape. Each light emission window is associated with a respective light source (not shown). Also a 180° rotation about a vertical axis is possible. In mounted position the first side of the lighting module is practically flush with the first and second rail, and rests solely with gravitation force on the track and is dismountable therefrom by a simple displacement of the lighting module in an upwards direction against the gravity direction 45. The opening is large enough to access the lighting module from by hand below for lifting the lighting module and to pass it through the opening and through plane P to below the track.

Figure 3:
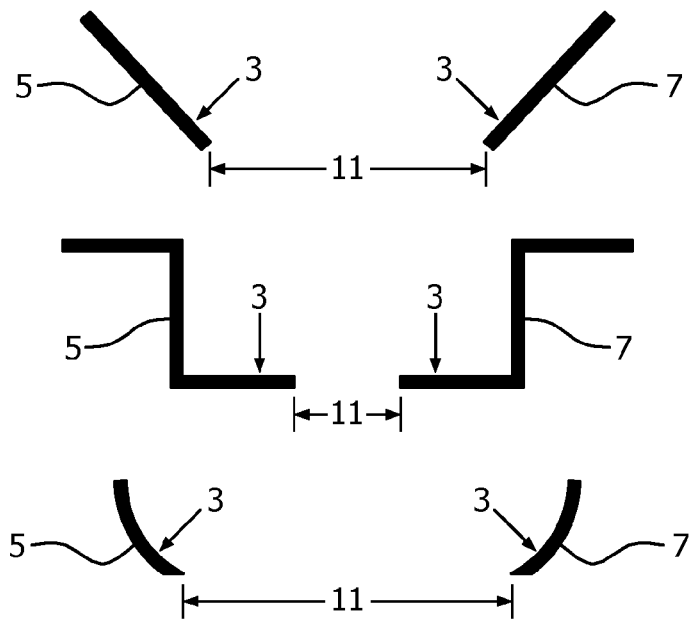
FIG. 3 shows cross sections of some profiles of rails of tracks according to the invention.

FIG. 3 shows cross sections of some rails of tracks 3 according to the invention. The upper embodiment shows a first 5 and second rail 7 which together form a wedge in cross sectional view, i.e. a V-shape from which the bottom part has been removed, thus causing the first and second rail to be spaced apart by the opening 11. In the central embodiment each rail 5,7 has an S- or Z-shaped cross section, which alternatively could be an L- or U-shaped cross-section. These shapes are relatively rigid which is favorable for elongated tracks as relatively few bridges (not shown) between the first and second rail are required to maintain the first and second rail in equidistant position. In the lower embodiment and viewed in cross-section, the first 5 and second rails 7 are concavely curved towards each other enabling some variation in tilt of a mounted lighting module on the track.

Figure 4:
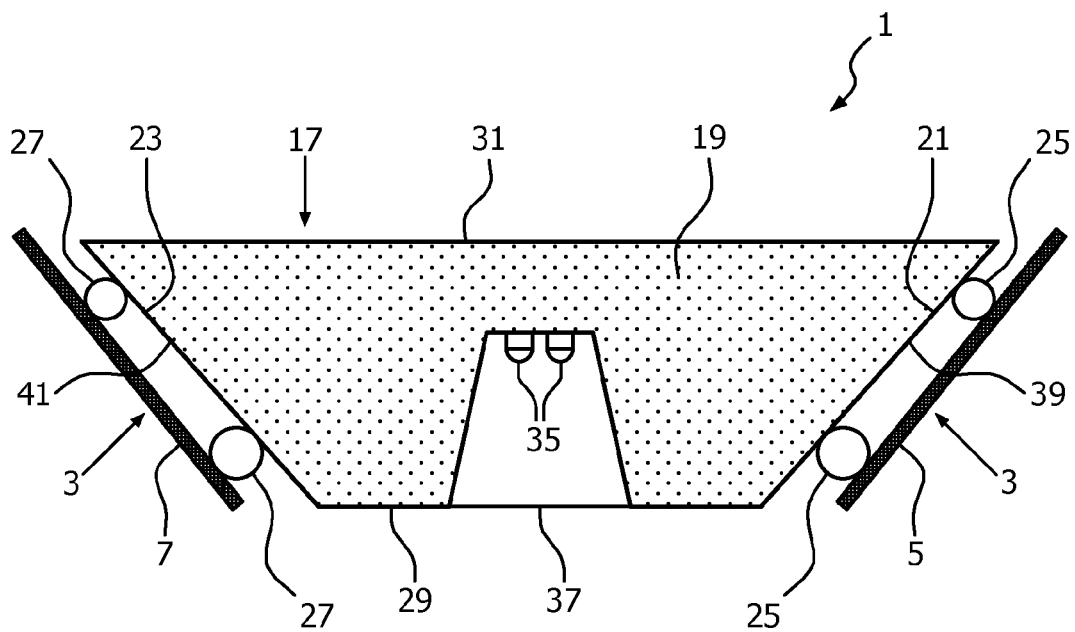
FIG. 4 shows a cross section of a second embodiment of the lighting system according to the invention.

FIG. 4 shows a cross section of a second embodiment of the lighting system 1 according to the invention. In this embodiment the lighting module 17 comprises a light source 35, in the figure two LEDs, in the base, which base 19 on its first side 29 has a light emission window 37 through which, during operation, light is issued to below the track 3. The lighting module at its first 21 and second end 23 has resilient contacts 25, 27 provided at a first 39 and second side face 41 extending from the first side 29 towards the second side 31 of the base and rests with these resilient contacts on the rails 5,7 of the wedge-shaped track 3.

Figure 5:
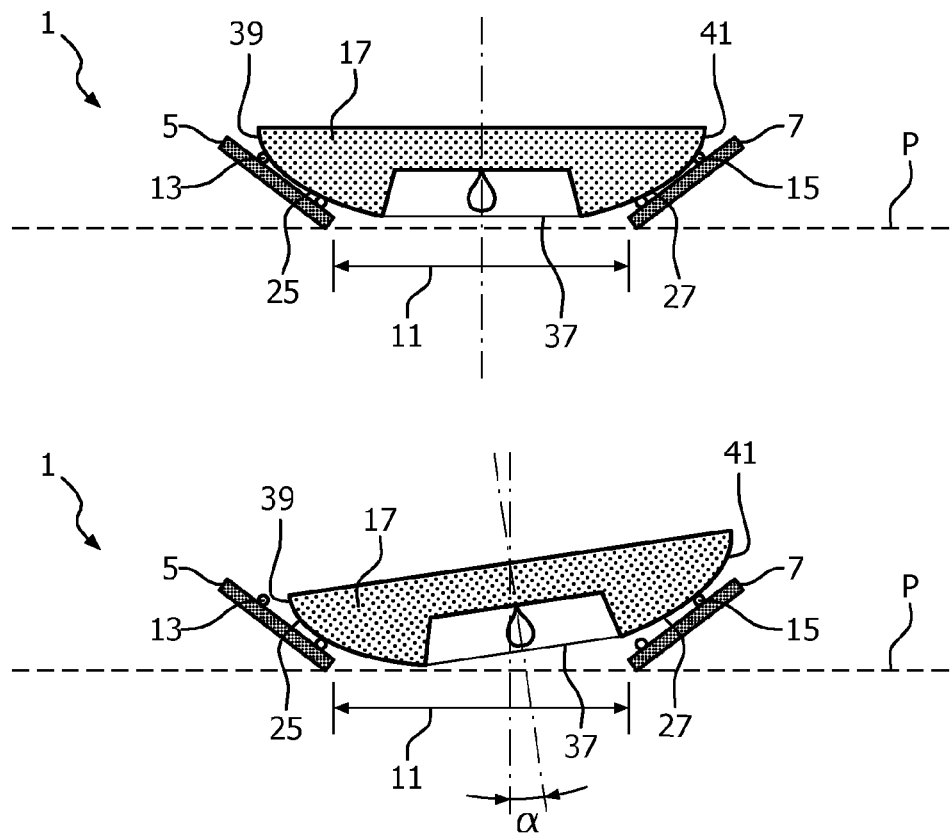
FIG. 5 shows cross sections of a third embodiment of the lighting system according to the invention.

FIG. 5 shows cross sections of a third embodiment of the lighting system 1 according to the invention with the lighting module 17 being in a horizontal position and in a tilted position with respect to the plane P and opening 11. The side faces 39,41 of the lighting module are curved and are each provided with a metallic electric conducting coating 25,27 which act as electric contacts 25,27 of the module and which electrically connect to respective electric conductive strips 13,15 provided on the rails 5,7. The frictional contact between lighting module and rails enable the lighting module to stay in a somewhat tilted orientation (for aiming a light beam 43 issued at a tilting angle α with the direction of gravity through the light emission window 37). However, when the tilting angle becomes too large, i.e. that an end 21,23 of the lighting module becomes positioned too close to the bottom part of one of the rails, it will automatically slide back into a smaller, safer titling angle.

Figure 6:
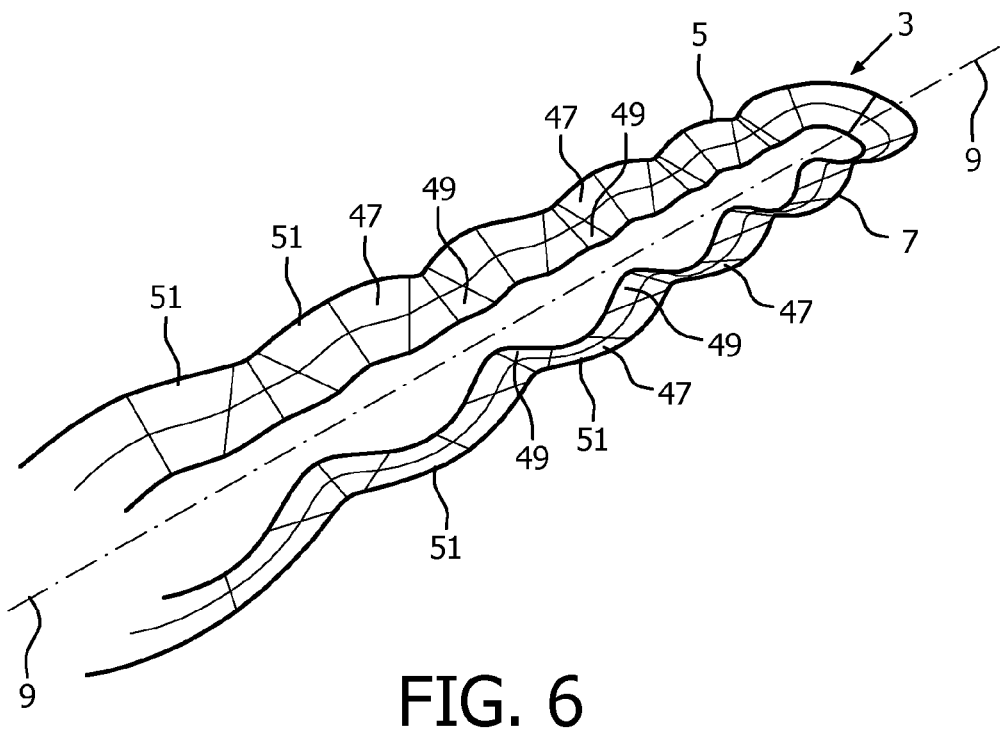
FIG. 6 shows an undulated version of the track of the lighting system according to the invention.

FIG. 6 shows an undulated version of the track 3 of the lighting system according to the invention. The track comprises mutually, axially aligned first 5 and second rails 7 which together form an open, truncated wedge. Said wedge extends along the axis 9 as a consecutive connected sequence of insets 47, which insets are formed by pairs of alternating inwardly 49 and outwardly bulging parts 51 of the first and second rail. The inwardly and outwardly bulging part of the first rail being axially aligned with the inwardly and outwardly bulging part of the second rail, axially aligned in this respect means that the inwardly bulging parts of the first rail are positioned directly opposite to the inwardly bulging parts of the second rail. The same goes for the outwardly bulging parts. The track thus formed has a shape similar to a caterpillar. The lighting module has a shape which matches with the shape of the insets. This type of track enables the track to be tilted along its length axis 9 and yet that lighting modules will not slide downwards over the track but stay located in the desired inset.

Figure 7:
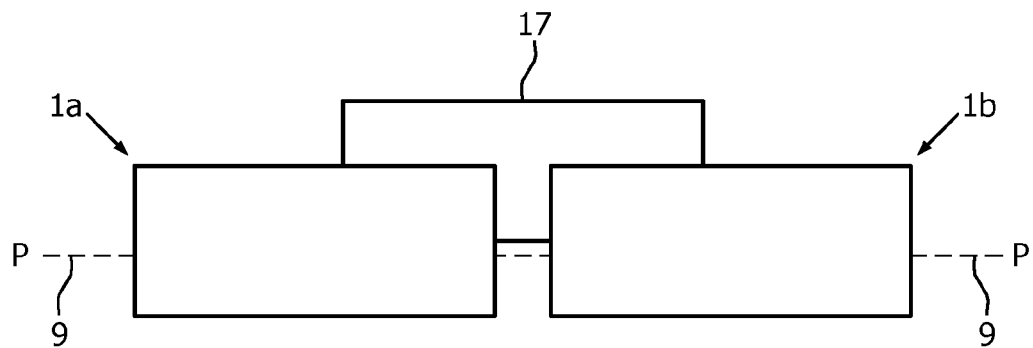
FIG. 7 shows two lighting systems being mutually coupled by a lighting module according to the invention.

FIG. 7 shows a first 1a and a second lighting system 1b being mutually coupled by a lighting module 17 according to the invention. In the figure the lighting coupling module is in one part which more or less requires that the tracks of the first and the second lighting system are aligned, i.e. extend in the same plane P in the same direction along the axis 9. P lies normal to the plane of the figure and parallel to the axis. Alternatively the lighting coupling module is in two parts which two parts are connected via a cable and which enables a much more flexible mutual orientation and/or position between the first and second lighting system.

Figure 8A:
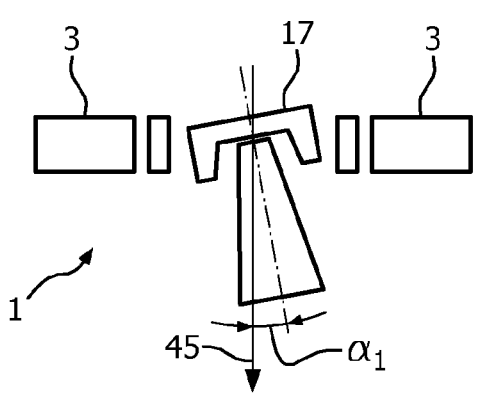
FIGS. 8A-D shows two tilts of two embodiments of a lighting module on a track of a lighting system according to the invention.
Figure 8B:
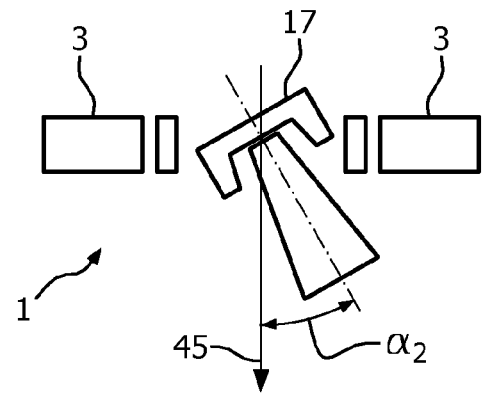
Figure 8C:
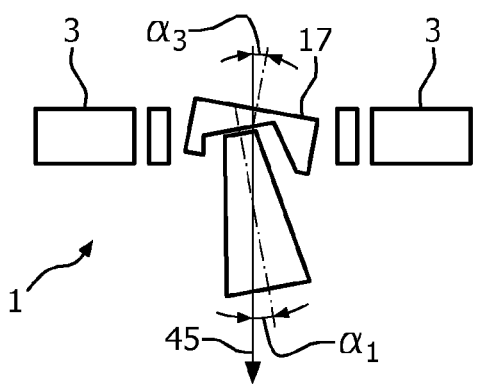
Figure 8D:
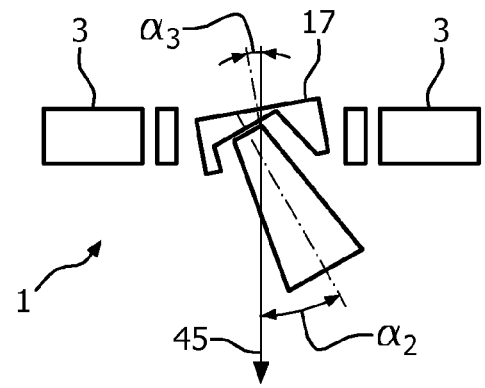

FIGS. 8A-D shows two tilted positions for two embodiments of lighting module 17 on a track 3 of the lighting system 1 according to the invention. FIGS. 8A-B relate to the same embodiment with a different tilt of the lighting module and hence issuing a light beam at respectively first α1 and second angle α2 with the direction of gravity 45. To issue the beam at the relatively large angle α2, the tilt of the lighting module has to be relatively large, i.e. also α2, which in some cases could become too large. By providing the lighting module in its base with a light source pre-tilted at an angle α3, as shown in FIGS. 8C-D, the direction of a light beam at an angle α2 requires only a relatively small tilt of the lighting module, i.e. α2-α3. To have the light being issued at an angle α1, the lighting module has to de tilted at an angle α1-α3, which could be a relatively small negative angle. Rotation of the module of 180° over a vertical axis (about) parallel to gravity, results in a similar, mirrored configuration.

Figure 9:
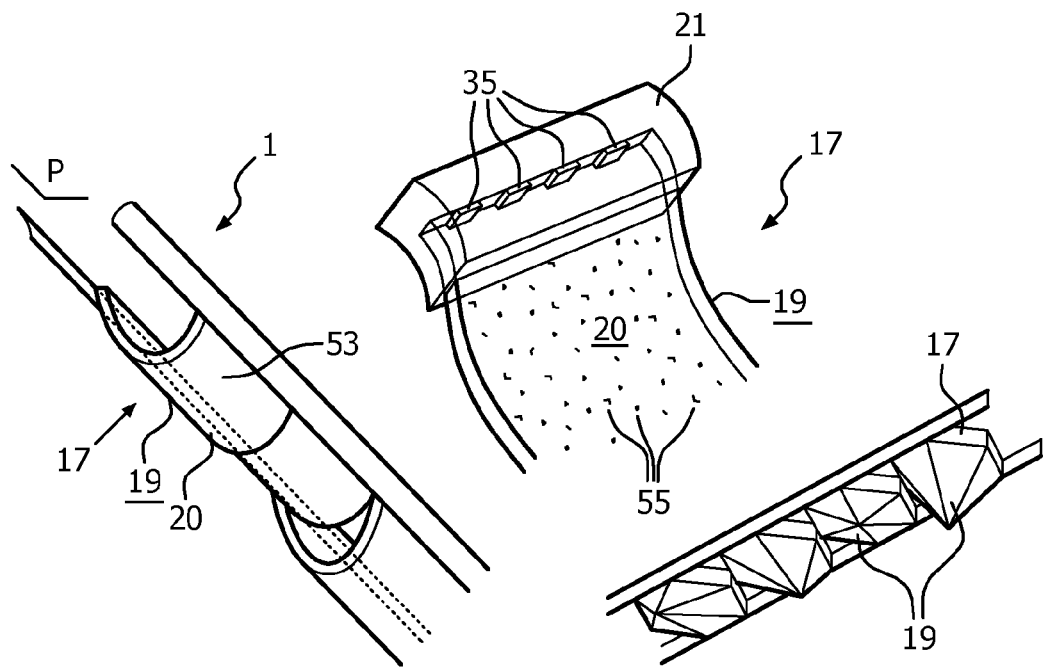
FIG. 9 shows different shapes of a light guiding base part of the lighting module according to the invention.

FIG. 9 shows different shapes of 3D-shaped lighting modules in a lighting system 1 according to the invention. In the light module 17 on the left in the figure, the lighting module comprises a light guide 20 part, in the figure made of PMMA, of a base 19 of the lighting module. The lighting module comprises light sources 35 at both the first 21 and second end 23 of the base 19 (shown in somewhat more detail in the middle of the figure) of which, during operation, their generated light is coupled into the light guide of the base. The light guide of the base comprises a downwardly bulging part 53 to below the plane P. The bulk of the light guide material is provided with a light outcoupling structure 55, in the figure light scattering particles, such that the bulging part homogeneously issues light. The embodiment on the right in the figure shows light modules with a 3D faceted base. At each facet at least one light source is located. A light distribution patterns or beam pattern is obtained in dependency of the facet structure of the base, hence is variety of light beam patterns is obtainable.

Figure 10:
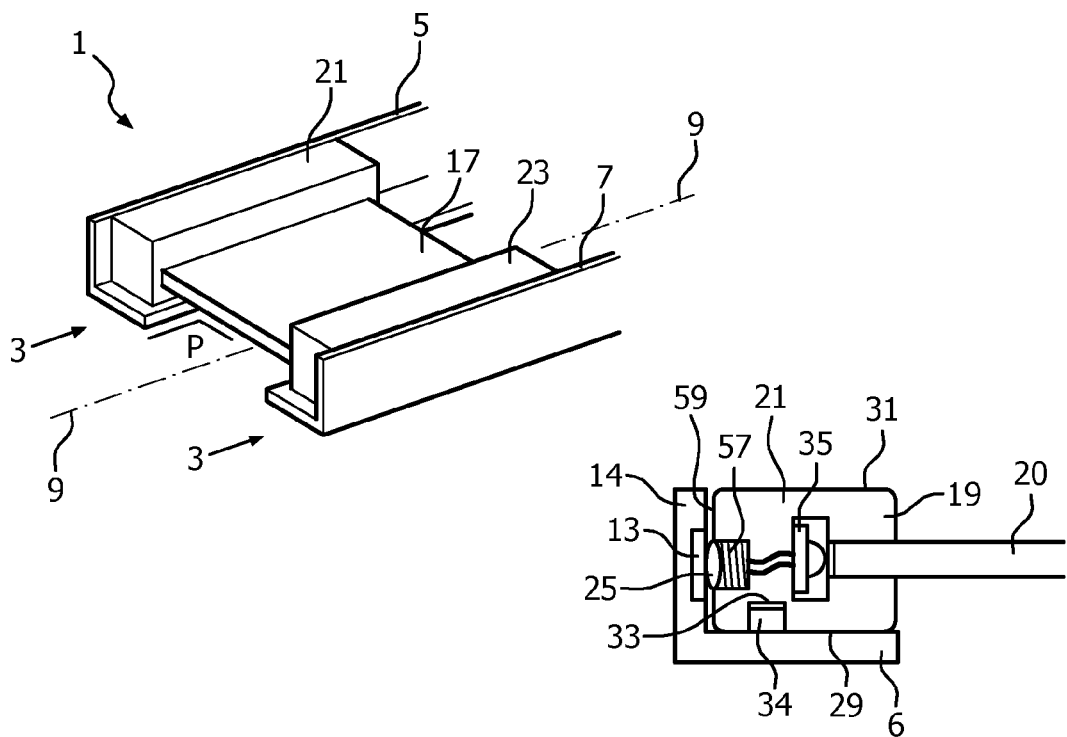
FIG. 10 shows a fourth embodiment of a lighting module according to the invention in perspective and partly in cross-section.

FIG. 10 shows a fourth embodiment of a lighting system 1 comprising a lighting module 17 according to the invention in perspective and partly in cross-section. The lighting system comprises a track 3 comprising rails 5,7 with an L-shaped cross section. Each rail has a conductive strip 13 (respectively 15) in its vertical rail wall 14 extending from the carrier side 6 normal to plane P along the axis 9. The carrier side is provided with a slider profile 34 which is gripped around by the groove 33 in the first side 29 of the base 19 of the lighting module to counteract the lighting module to shift radially from the rails (and subsequently fall down). The lighting module at its first 21 (and second 23) end of its base has electrical contacts 25 (and 27) resiliently seated via a spring 57 in a first 59 (and second 61) side face extending from the first side 29 to the second side 31 of the base and electrically contacts with resilient force the conductive strip of the rail. Via the conductive strip and the resiliently seated electrical contact the light source 35, in the figure a LED, is powered. Light from the light source is coupled into a light guide base part 20 of the base and subsequently coupled out therefrom.

Figure 11:
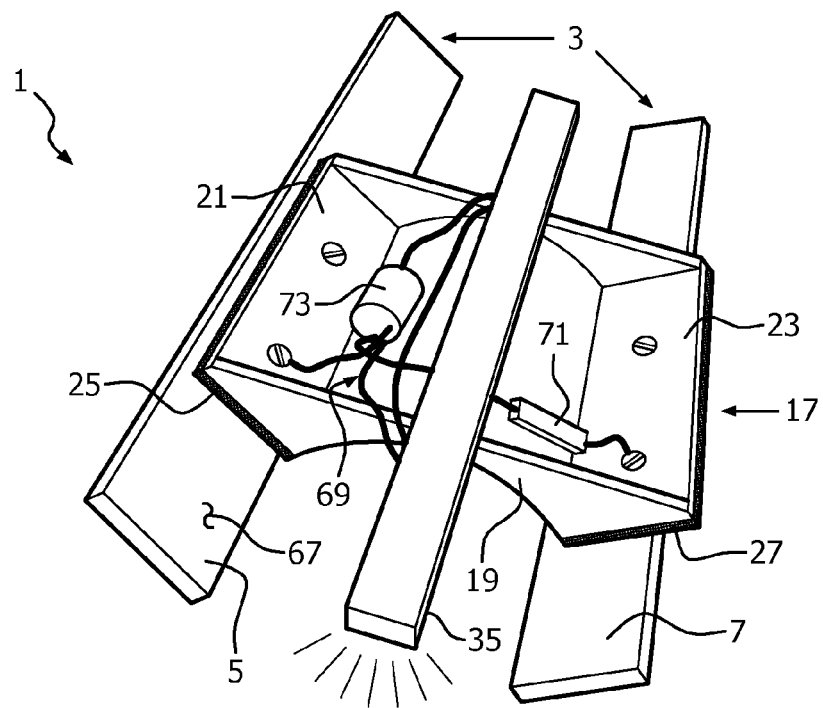
FIG. 11 shows a perspective top view of a capacitive coupled lighting module flexibly mounted on the track.

FIG. 11 shows a perspective top view of lighting system 1 comprising a capacitive coupled lighting module 17 flexibly mounted on the track 3. The rails 5,7 of the track are coated with an electrically isolating coating 67 (see also FIG. 12). The lighting module has at its first 21 and second end 23 of its base 19 two copper plates as first 25 and second electrical contacts 27 which are flexibly connected to the base. The base itself is made from transparent silicone comprising an electronic circuit 69 connected to the copper plates and comprising a simple 4 diodes bridge 71 and an inductor 73 connected to the light source 35. The diode bridge can be omitted when two strings of LEDs are used that are connected in opposite directions. In that case the LED strings will light up sequentially, but as this is done at high frequency that cannot be observed.

Figure 12:
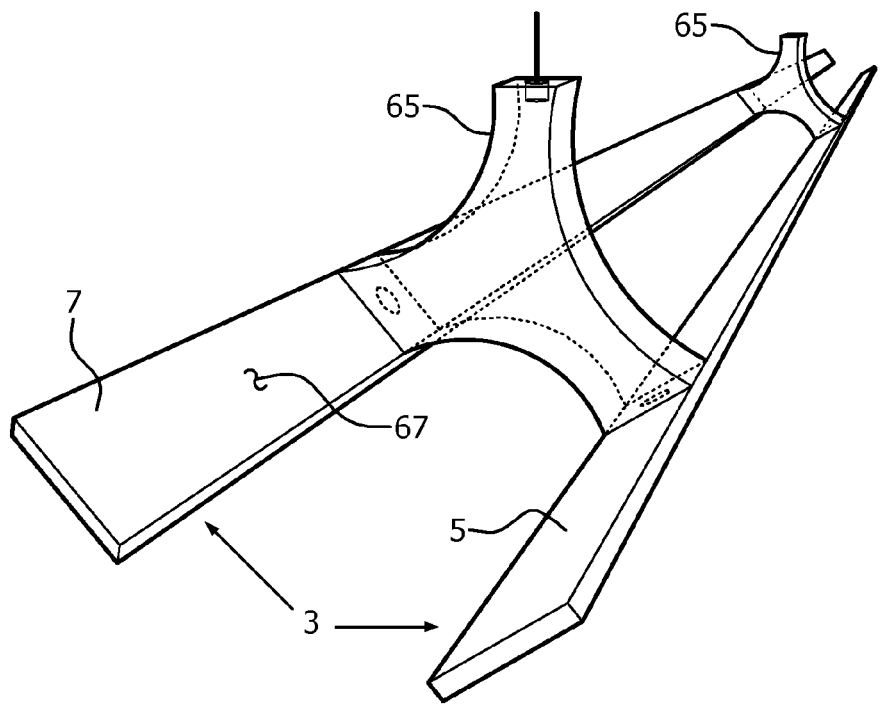
FIG. 12 shows a coated track suitable for capacitive energy transfer to a lighting module.

FIG. 12 shows a coated track 3 suitable for capacitive energy transfer to a lighting module (not shown). In the figure the track comprises two alumina rails 5,7 painted with a greyish, electrically isolating coating 67, in the figure a paint. The color of the paint can be chosen such that the track will stand out from or will merge into its background. The first and second rails of the track are coupled to each other via bridges 65, in the figure two bridges made of Perspex. The bridges are mutually positioned at relatively large axial distance which enables ample possibilities for free movement and positioning of the lighting modules. Said bridges could simultaneously function as suspension means for the lighting system to be suspended, for example via cables, from a ceiling.

Figure 13:
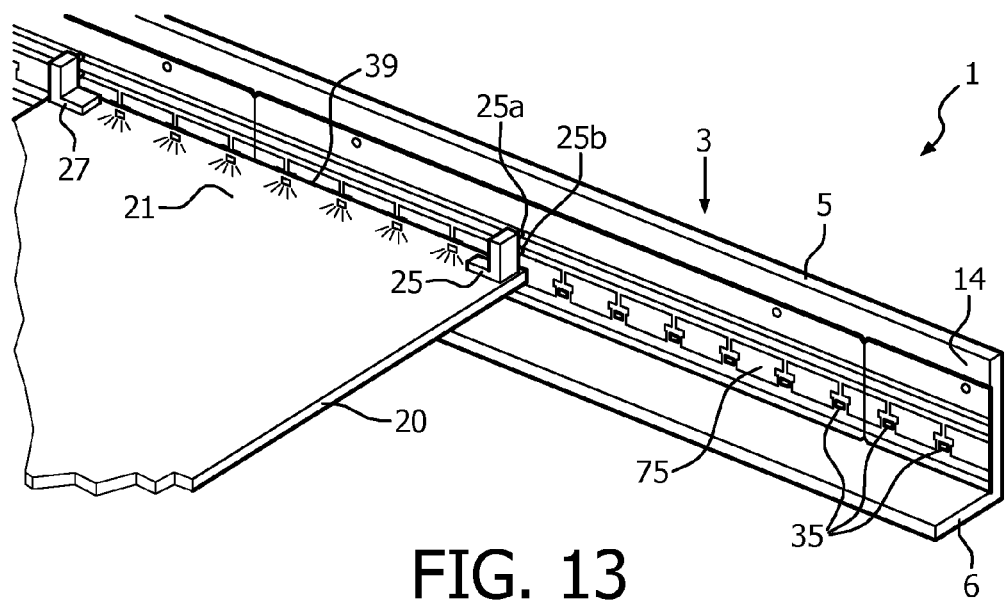
FIG. 13 shows a fifth embodiment of the lighting system according to the invention with the light sources located in the track.
Figure 14:
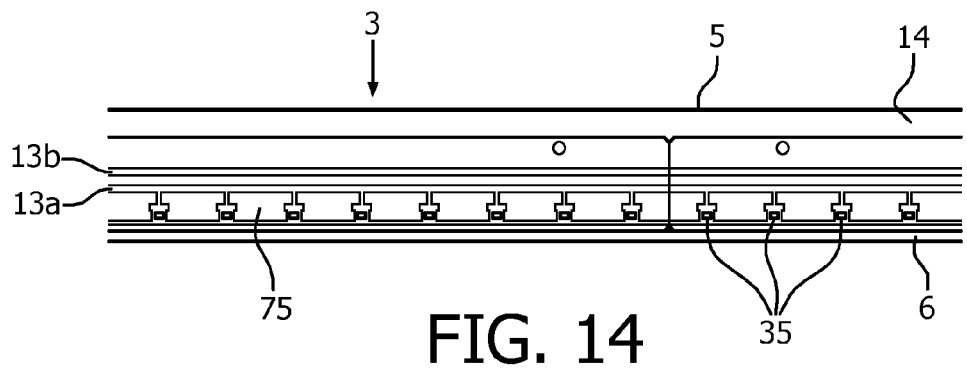
FIG. 14 shows a detail of a rail provided with the light sources mounted on a PCB of FIG. 13.

FIG. 13 shows a perspective view of a part of a fifth embodiment of the lighting system 1 according to the invention during its operation. The lighting system comprises a track 3 with L-profiled rails in 5 (and 7) which the light sources 35, LEDs in the figure, are located on the rail wall 14 on a respective PCB 75. The LEDs and PCBs are designed such that the LEDs line up exactly with the light guide base part 20 (optic plate) of the lighting module. Above the row of LEDs there is an anode 13a and a cathode conductive strip 13b. The profile of the conductive strips is designed such that all LEDs are connected in series. The conductive strips axially extend continuously from the beginning till the end of the track. The lighting module is carried by the carrier side 6 of the rails. The lighting module comprises at each end 21 (and 23) two electrical contacts 25 (and 27), each electrical contact is made as a block of copper with two resiliently seated pins 25a,25b (and 27a,27b) each. The two pins per block are a distance to each other that correspond with the distance between the conductive strips provided on the PCB, see in particular FIG. 14 which shows a detail of a rail provided with the light sources mounted on a PCB of FIG. 13. The pins also provide for the force necessary to make a proper contact between the different conductive strips on the PCB via the connector-block. As shown in the figure, this configuration results in that only the LEDs are operating which are located in between the two electrical contacts per side face 39 (and 41). Light of the operated LEDs is coupled into the light guide base part 20 and extracted therefrom via scattering particles embedded in the bulk material of the light guide base part. As the light guide base part has a light emission window 37 in both its first 29 and second side (31), light will be issued both upwards and downwards. Instead of light scattering particles in the bulk it is alternatively possible to provide the light guide base part with an optical light extracting film, or a local light extraction pattern, for example slits 55 as shown in FIG. 15, to extract the light.

Figure 15:
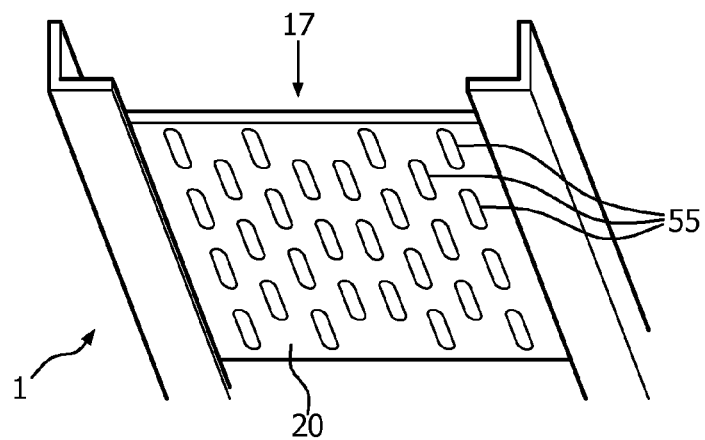
FIG. 15 shows a bottom view of a lighting module with an alternative light guide base part suitable for use in the lighting system of FIG. 13.

FIG. 15 shows a bottom view of a lighting system 1 comprising a lighting module 17 with an alternative light guide base part 20 suitable for use in the lighting system of FIG. 13. The light guide base part is made of optically transparent light guiding material, such as PMMA, and is provided with laser cut slits as light outcoupling structure (or light extraction structure), see also FIG. 19 for more details on this. Many alternative embodiments of the light guide base part are envisaged.

Figure 16:
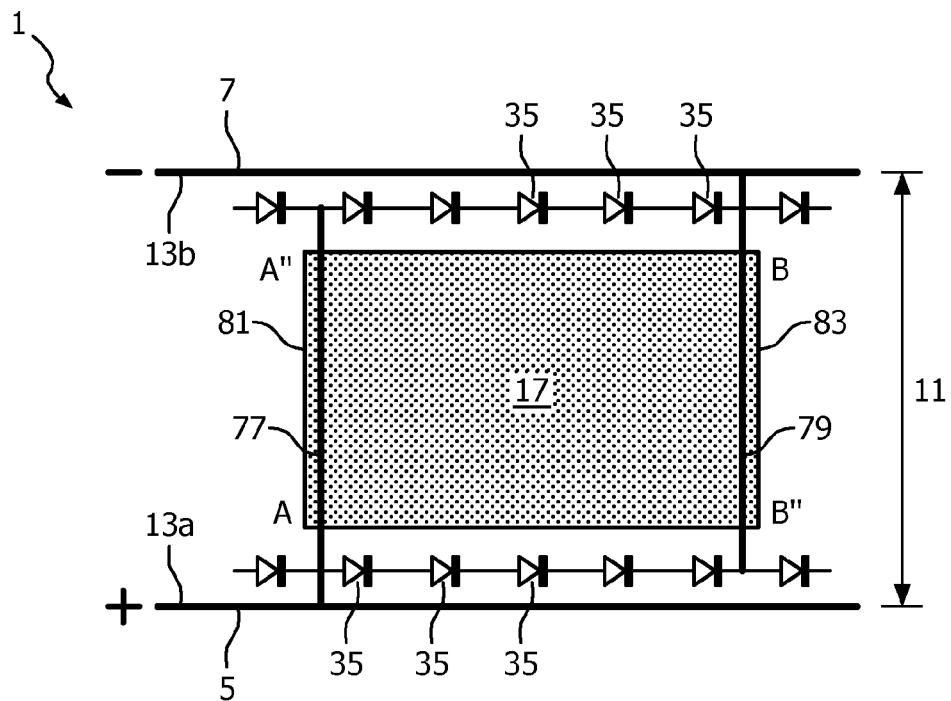
FIG. 16 shows an embodiment of the anode and cathode strip being located in different rails and an embodiment of a lighting module connecting these strips.

FIG. 16 shows an embodiment of the lighting system 1 in which the anode 13*a* and cathode electrically conductive strip 13*b* are located in the first 5 respectively the second rails 7 and an embodiment of a lighting module 17 connecting these strips. In some cases it can be desired to have a single electrical connection per rail. In this case the plus and minus need to cross the opening 11 between the rails via the module. Thereto the lighting module is provided with a first 77 and a second connector strip 79 on a first 81 respectively on a second transverse side face 83. Said first and second transverse side face of the lighting module extend between the first and second rail and bridge the opening between these rails. Only that part of the light sources 35 between the contacts made by the connector strips, in the figure a first 85 and second LED-string part 87, will lighten up. One side of the track, for example the first rail, has LEDs a plus electrode, while the other side, for example the second rail, has LEDs and a minus electrode. The first connector strip connects the plus electrode to the start of the first and second LED string part located in the first respectively the second rail. The second connector strip connects the minus electrode to the end of the first and second LED string part.

Figure 17:
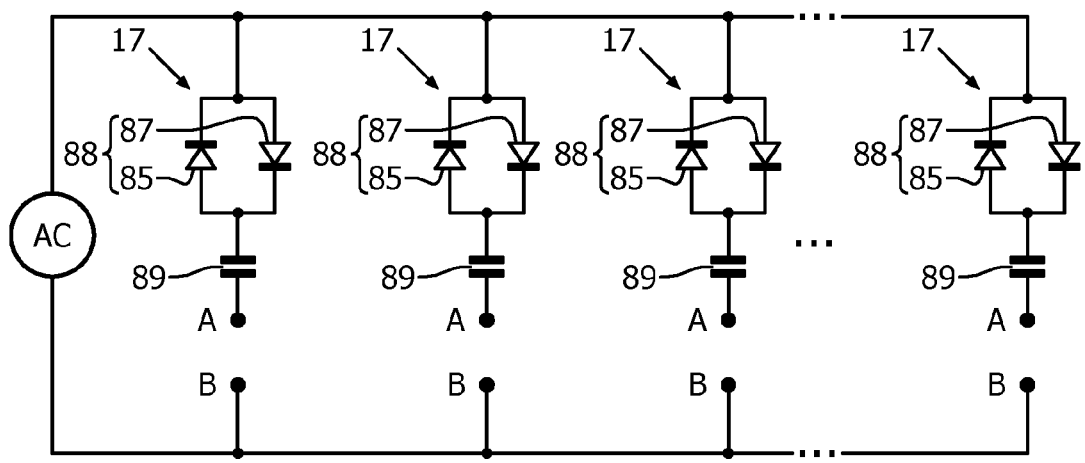
FIG. 17 shows an electric scheme for parallel mounted arrangement of a plurality of lighting modules or light sources on the track.

FIG. 17 shows an electric scheme for parallel mounted arrangement of a plurality of lighting modules 17 on the track. In the embodiment of FIG. 16, all LEDs are connected in series and installment of more than one module requires additional measures. Thereto in the embodiment of FIG. 17 an additional capacitor 89 is comprised in each of the electrical circuits shown in FIG. 16 to take care of current control. The first 85 and second LED string parts 87 are grouped in pairs 88 per lighting module and connected in anti-parallel to a respective capacitor. Because the LEDs are driven in AC mode the capacitor acts as an efficient current control. The lighting module now only needs to make a connection between point A and B, which connection is attained upon mounting of the lighting module on the track. Everywhere where this connection is made, the pair of LED string parts will light up. This arrangement allows any number of LEDs to be connected.

Figure 18A:
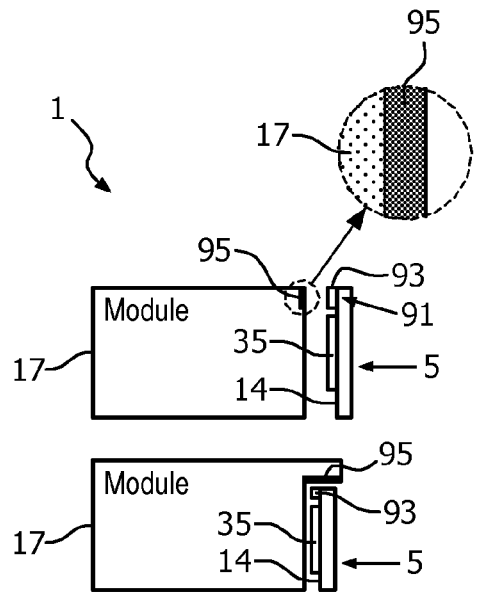
FIGS. 18A-B shows a cross-section of the constructions of a reed-contact and sensor as located in the rail(s)
Figure 18B:
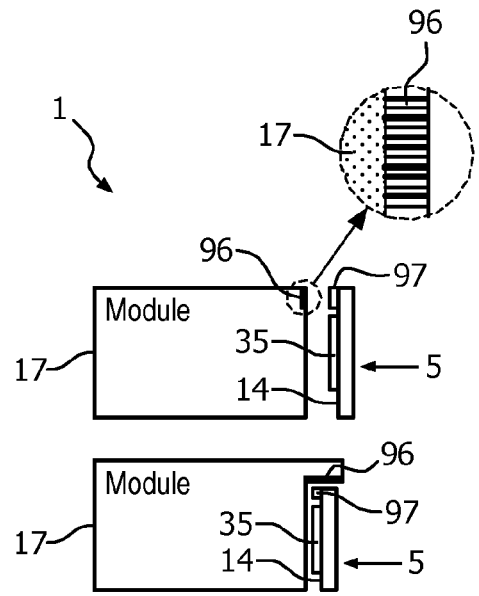

FIGS. 18A-B shows a cross-section of constructions of a reed-contact 91 respectively constructions of a sensor 97 as located in the first rail 5 (and second rail 7, not shown). In FIG. 18A the lighting module 17 is provided on its first side face 59 with a band 95 of magnetic material. On the rail wall 14 of the first rail a Reed switch 93 is located. The combination of Reed switch and magnetic material forms a Reed contact. When the magnetic material strip and Reed switch are properly aligned, the reed switch will close the circuit that enables to lighten up the LED 35 that is directly below the switch. In more advanced embodiments of the lighting system 1 this method of establishing (electrical) contact alternatively enables information to be packed into the pattern 96 of the band. This information could give every LED information on the (type of) light that is required at that particular place. The last method is by using the LEDs and the light-guiding property of the light guide base part 20 of the lighting module. Even though most of the light coupled in at the first end 21 should be out-coupled before reaches the second end of the light-guide base part, a remainder of the light will reach the other end of the light guide. This remainder of light can be sensed and the information on the strip can be read and be used to perform subsequent actions, for example to change the color of the light.

Figure 18C:
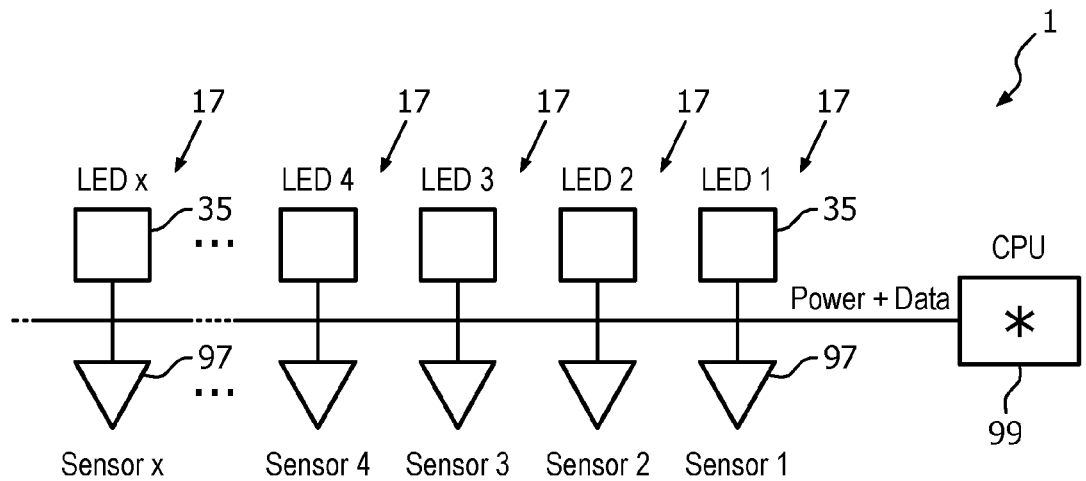
FIG. 18C shows an electric scheme of the lighting system for control of the various lighting modules/light sources.

FIG. 18C shows an electric scheme of the lighting system for control of the various lighting modules 17 or light sources 35 provided with a respective sensor 97 which enables to create a desired behavior of the lighting system 1 by actively detecting a respective lighting module and creating a subsequent action to it. In the figure the individual LEDs and the individual sensors are setup in a network and every LED and sensor has a predefined position and address. The CPU 99 comprises artificial Intelligence and collects all the sensor information, defines the action between input and output and drives the LEDs.

Figures 19A, 19B:
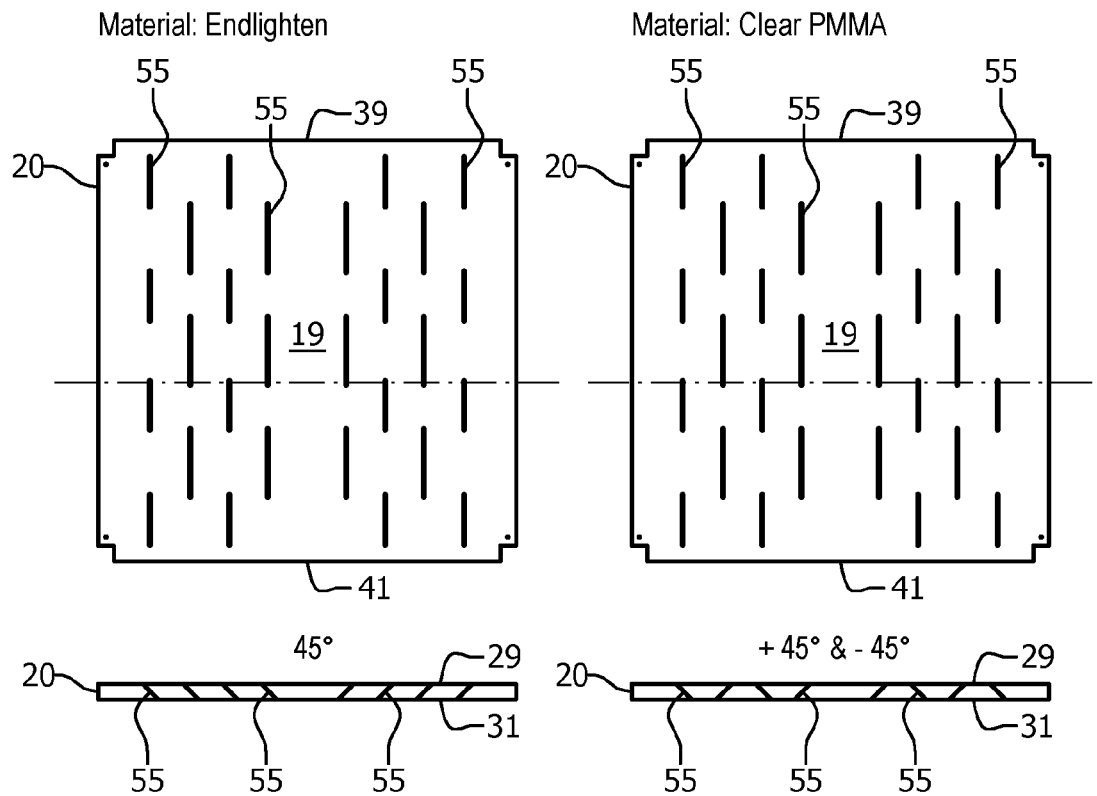
FIGS. 19A-B shows both top views and transverse cross-sections of two different light guide base parts of lighting modules.

FIGS. 19A-B shows both top views and transverse cross-sections (over the dotted line shown in the top view) of two different light guide base parts 20 of lighting modules (17) for use in a lighting system with the light sources located in the track. Many different lighting module embodiments are envisaged, for example similar light guide base parts but then with light sources located at the first and/or second end of the base. The basic form of the lighting module is typically a light guide of which the side faces 39,41 align directly with the LEDs in the track. There are countless possibilities of embodiments of the light guide base part, for example a normal straight square plate of PMMA with light diffusing particles mixed in homogeneously, or 3D shaped light guide base parts (see FIG. 13 respectively FIG. 9).

The embodiments shown in FIGS. 19A-B have a light guide base part 20 of Endlighten material, which comprises embedded colorless light diffusing particles as part of the light outcoupling structure (not visible). The light guide base part further comprises as a part of the light outcoupling structure 55 slits that have been laser cut into the material at a 45° angle with the parallel first 29 and second side 31 of the base 19. This light guide base part made of EndLighten material will be almost perfectly transparent until the LEDs are turned on. Then said light guide base part is a homogeneous diffuse light source if not laser cuts are made into said material. The laser cuts made inside the light guide base part will cause light that hits the slit to be redirected and thus change direction due to total internal reflection. In FIG. 19A this will result in downwards reflection of the main portion of the light that has not been scattered. Through some diffusion by the scattering particle dope in the material a small portion of the incoupled light is scattered in all directions both upwards and downwards. This embodiment of FIG. 19A will result the lighting module to direct mainly light downwards and only little upwards and the lighting module is observed as to behave as a spot as the light from the sides is re-directed mainly into one direction. Alternatively, if only one main direction is desired a simple mirror, for example a MIRO foil, can be added to one side. This will cause the light to be issued from the lighting module with about double intensity on one side compared to the intensity of light at the other side.

Many other patterns of slits and structures can be designed, for example see FIG. 19B in which the light guide base part, made of clear PMMA, is provided with an alternating pattern of slits at angles of +45° and −45° with the parallel first and second side of the base. This light guide base part provided with these laser cut slits in two orientations will create a spot downwards and a spot in upward direction.

Note that both in the embodiment of FIGS. 19A and 19B the slits do not fully extend from the first side to the second side or from the second side to the first side, as this will compromise the mechanical strength, robustness and stability of the light guide base part. In order to get most light redirected preferably three rows of slits are made.

FIG. 20 shows a perspective view of a sixth embodiment of the lighting system 1 according to the invention. The lighting device of the figure is suspended from a ceiling 101 via cables 63 attached to bridges 65 which connect the first 5 and second rails 7 of the track 3 of the lighting system. Alternatively such a lighting system can be mounted in a recessed manner into a (false) ceiling 101. Via said cables the lighting system is electrically connected to the mains power source. The lighting system comprises a plurality of lighting modules 17, four in the figure, which can be freely shifted over the track along the length axis 9. The track of the lighting system is rigid, such that it will not deform under its own weight by which it suspends from the cables/bridges and also will not deform under the load of the lighting modules. This embodiment of the lighting system is not feasible with lighting systems in which the track is formed by a pair of equidistant electric conductive (metallic) cables as rails.

The invention claimed is:

1. A lighting system accommodating a light source, the lighting system comprising:
    a track comprising at least a first rail and a second rail mutually extending equidistantly along an axis, said first rail and said second rail are spaced apart by an opening defining a plane P, the first rail comprising a first electrically conductive strip and the second rail comprises a second electrically conductive strip, said strips are mutually electrically isolated,
    at least one lighting module comprising:
        a first electrical contact and a second electrical contact, each being adapted to make electrical contact with a respective one of the first and second electrically conductive strips when supported by a respective carrier side of the first rail and the second rail, and
        a light guide base having a mutually opposing first and second sides, the lighting module and the track being free from mutual overhang to enable to dismount the lighting module from the track by a displacement in a direction essentially perpendicular to plane P,
    wherein the track comprises the light source having a plurality of light emitters disposed on the track, and
    wherein the lighting module has a light incoupling surface facing towards the light source to receive light emitted by the light source from the track and a light outcoupling surface at the first side of the light guide base.

2. The Lighting system as claimed in claim 1, wherein at least one of the rails comprises at least one PCB on which at least one LED is mounted.

3. The Lighting system as claimed in claim 1, wherein the lighting module is an optic plate, made from PMMA.

4. The Lighting system as claimed in claim 3, wherein at least one of first and second sides of the optic plate comprises a light outcoupling pattern.

5. The Lighting system as claimed in claim 1, wherein the lighting module has its electrical contacts at end parts that contact the strips, in mounted position of the lighting module on the rails, and wherein said electrical contacts at a first contact point and a second contact point connect respectively to an anode contact strip and a cathode contact strip provided in the rails, to enable ignition of the light sources located in between said first and second contact points.

6. The Lighting system as claimed in claim 5, wherein the anode is located in the first rail and the cathode is located in the second rail, and wherein the lighting module on transverse side faces bridging the gap between the first and second rails and extending between the first and second sides, is provided with connector strips to close an electrical circuit and to enable ignition of the light sources that are comprised in said electrical circuit.

7. The Lighting system as claimed in claim 1, wherein the light incoupling surface comprises a side face extending from the first side towards the second side and facing towards the light sources located on the rail at a respective rail wall extending from the carrier side normal to plane P along the axis.

8. The Lighting system as claimed in claim 1, wherein at least one of the rails comprises a reed or a direct contact switch.

9. The Lighting system as claimed in claim 1, wherein the lighting system is AC driven and wherein the light sources are grouped in pairs and electrically connected anti-parallel to a capacitor.

10. The Lighting system as claimed in claim 1, wherein the lighting system comprises at least one sensor.

11. Lighting system as claimed in claim 1, wherein the lighting system comprises a sensor and a detectable material, and wherein a combination of the sensor and the detectable material is selected from a group consisting of:
    (1) Reflective material+optical reflection sensor;
    (2) Magnetic strip+magnetic sensor including a Hall sensor or a Reed switch;
    (3) Electrical conductive strip+connectors including pins that connect galvanic;
    (4) Conductive strip+capacitive sensor; and
    (5) RF tag/transmitter in the module and detectors/receivers in the LED/rail.

12. The Lighting system as claimed in claim 1, wherein the lighting source comprises at least one LED.

13. The Lighting system as claimed in claim 1, wherein the lighting system comprises an automatic tuning circuit.

14. The Lighting system as claimed in claim 1, wherein the track has an elongated shape along the axis, the lighting module being shiftable over said track along the length axis.

15. The Lighting system as claimed in claim 1, wherein the first and second rails are embodied as heat sinks to dissipate heat generated by the lighting module.

16. A lighting system accommodating a light source, the lighting system comprising:
    a track comprising at least a first rail and a second rail mutually extending equidistantly along an axis, said first rail and said second rail are spaced apart by an opening defining a plane P, one of the first and second rails comprising a first electrically conductive strip and a second electrically conductive strip, said first and second electrically conductive strips are mutually electrically isolated,
    at least one lighting module comprising:
        a light guide base having a mutually opposing first and second sides, the lighting module and the track being free from mutual overhang to enable to dismount the lighting module from the track by a displacement in a direction essentially perpendicular to plane P, and
        first and second electrical contacts on one of the opposing first and second sides, each of the first and second electrical contacts being adapted to make electrical contact with a respective one of the first and second electrically conductive strips when supported by a respective carrier side of the first rail and the second rail, wherein the track comprises the light source having a plurality of light emitters disposed on the track, and wherein the lighting module has a light incoupling surface facing towards the light source to receive light emitted by the light source from the track and a light outcoupling surface at the first side of the light guide base.

17. The lighting system of claim 16, wherein only the light emitters disposed between the first and second electrical contacts are operating.

* * * * *